(12) United States Patent
Saine

(10) Patent No.: US 11,975,350 B2
(45) Date of Patent: *May 7, 2024

(54) ADHESIVE DISPENSING SYSTEM WITH CONVERTIBLE NOZZLE ASSEMBLIES

(71) Applicant: NORDSON CORPORATION, Westlake, OH (US)

(72) Inventor: Joel E. Saine, Dahlonega, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,173

(22) Filed: Mar. 14, 2023

(65) Prior Publication Data

US 2023/0211371 A1    Jul. 6, 2023

Related U.S. Application Data

(60) Continuation of application No. 17/066,610, filed on Oct. 9, 2020, now Pat. No. 11,607,706, which is a
(Continued)

(51) Int. Cl.
  *B05B 15/65*   (2018.01)
  *B05B 7/02*    (2006.01)
  (Continued)

(52) U.S. Cl.
  CPC .......... *B05C 11/1007* (2013.01); *B05B 7/025* (2013.01); *B05B 11/1049* (2023.01);
  (Continued)

(58) Field of Classification Search
  None
  See application file for complete search history.

(56) References Cited

U.S. PATENT DOCUMENTS

| 3,518,967 | A | 7/1970 | Horrocks |
| 4,687,137 | A | 8/1987 | Boger et al. |

(Continued)

FOREIGN PATENT DOCUMENTS

| CN | 1378884 A | 11/2002 |
| CN | 2644737 Y | 9/2004 |

(Continued)

OTHER PUBLICATIONS (IPEA/408) Written opinion under Chapter II dated Aug. 3, 2018 for WO Application PCT/US17/050417.
(Continued)

*Primary Examiner* — Binu Thomas
(74) *Attorney, Agent, or Firm* — BakerHostetler

(57) ABSTRACT

An adhesive dispensing system for applying liquid adhesive to a substrate using different nozzles with the same manifold is disclosed. The adhesive dispensing system includes a manifold having a body, a first clamp configured to engage the body of the manifold, a second clamp configured to engage the body of the manifold, and a nozzle. The first and second clamps secure the nozzle to the body of the manifold. The body of the manifold has a first contact surface that engages the first clamp and a second contact surface that engages the second clamp and the nozzle, where the second contact surface is angularly offset from the first contact surface.

20 Claims, 21 Drawing Sheets

Related U.S. Application Data division of application No. 15/698,086, filed on Sep. 7, 2017, now Pat. No. 11,148,167.

(60) Provisional application No. 62/385,238, filed on Sep. 8, 2016.

(51) Int. Cl.

| | | |
|---|---|---|
| *B05B 11/10* | (2023.01) | |
| *B05B 13/02* | (2006.01) | |
| *B05C 5/02* | (2006.01) | |
| *B05C 11/02* | (2006.01) | |
| *B05C 11/10* | (2006.01) | |
| *B05C 19/00* | (2006.01) | |
| *B01F 25/54* | (2022.01) | |
| *B01F 25/62* | (2022.01) | |
| *B05B 9/04* | (2006.01) | |
| *B05C 5/00* | (2006.01) | |
| *B32B 37/12* | (2006.01) | |
| *F04B 49/20* | (2006.01) | |
| *F04C 2/18* | (2006.01) | |
| *F04C 11/00* | (2006.01) | |
| *F04C 14/08* | (2006.01) | |
| *F04D 15/00* | (2006.01) | |

(52) U.S. Cl.
CPC .......... *B05B 13/0278* (2013.01); *B05B 15/65* (2018.02); *B05C 5/02* (2013.01); *B05C 5/0225* (2013.01); *B05C 5/0279* (2013.01); *B05C 11/025* (2013.01); *B05C 11/1026* (2013.01); *B05C 11/1042* (2013.01); *B05C 11/1044* (2013.01); *B05C 19/008* (2013.01); *B01F 25/54* (2022.01); *B01F 25/62* (2022.01); *B05B 9/0403* (2013.01); *B05C 5/001* (2013.01); *B05C 5/0258* (2013.01); *B05C 5/027* (2013.01); *B05C 11/1002* (2013.01); *B05C 11/1039* (2013.01); *B32B 37/1284* (2013.01); *F04B 49/20* (2013.01); *F04C 2/18* (2013.01); *F04C 11/001* (2013.01); *F04C 14/08* (2013.01); *F04D 15/0066* (2013.01)

(56) References Cited

U.S. PATENT DOCUMENTS

| | | |
|---|---|---|
| 5,228,594 A | 7/1993 | Aslin |
| 5,236,641 A | 8/1993 | Allen et al. |
| 5,389,151 A | 2/1995 | Fort |
| 5,409,642 A | 4/1995 | Allen et al. |
| 5,458,291 A | 10/1995 | Brusko et al. |
| 5,620,315 A | 4/1997 | Pfuhler |
| 5,632,938 A * | 5/1997 | Buehning, Sr. ........ B29C 48/345 425/464 |
| 5,636,790 A | 6/1997 | Brusko et al. |
| 5,727,933 A | 3/1998 | Laskaris et al. |
| 5,740,963 A | 4/1998 | Riney et al. |
| 5,862,986 A | 1/1999 | Bolyard et al. |
| 6,089,413 A | 7/2000 | Riney et al. |
| 6,210,141 B1 | 4/2001 | Allen |
| 6,296,463 B1 | 10/2001 | Allen |
| 6,422,428 B1 | 7/2002 | Allen et al. |
| 6,517,891 B1 | 2/2003 | Estelle et al. |
| 6,607,104 B2 | 8/2003 | McGuffey |
| 6,688,498 B1 | 2/2004 | McGuffey |
| 7,611,071 B2 | 11/2009 | Bolyard et al. |
| 7,699,243 B2 | 4/2010 | Starke |
| 7,878,375 B2 | 2/2011 | Yajima |
| 7,908,997 B2 | 3/2011 | Lessley et al. |
| 8,220,725 B2 | 7/2012 | Gressett et al. |
| 8,445,061 B2 | 5/2013 | McGuffey |
| 8,561,656 B2 | 10/2013 | Eginton et al. |
| 9,126,222 B2 | 9/2015 | McGuffey |
| 9,168,554 B2 | 10/2015 | Saine et al. |
| 9,415,415 B1 | 8/2016 | Jones |
| 9,427,766 B2 | 8/2016 | Varga |
| 9,573,159 B2 | 2/2017 | McGuffey |
| 9,889,599 B2 | 2/2018 | Ayers |
| 9,925,552 B2 | 3/2018 | Saine |
| 11,148,167 B2 * | 10/2021 | Saine .................... B05C 5/0225 |
| 2001/0024618 A1 | 9/2001 | Winmill |
| 2002/0102324 A1 | 8/2002 | Groleau |
| 2002/0139818 A1 | 10/2002 | McGuffey |
| 2003/0062384 A1 | 4/2003 | McGuffey |
| 2003/0098317 A1 | 5/2003 | McGuffey |
| 2004/0099752 A1 | 5/2004 | Boger |
| 2004/0124251 A1 | 7/2004 | Gressett et al. |
| 2004/0159672 A1 | 8/2004 | Auber et al. |
| 2005/0230423 A1 | 10/2005 | Riney et al. |
| 2005/0242108 A1 | 11/2005 | Harris et al. |
| 2005/0274317 A1 | 12/2005 | De et al. |
| 2006/0182887 A1 | 8/2006 | Miller |
| 2007/0246576 A1 | 10/2007 | Bolyard et al. |
| 2008/0023489 A1 | 1/2008 | Lessley |
| 2008/0135650 A1 | 6/2008 | Starke |
| 2008/0169362 A1 | 7/2008 | Kwan et al. |
| 2008/0245298 A1 | 10/2008 | Ayers |
| 2009/0214372 A1 | 8/2009 | McGuffey et al. |
| 2009/0242591 A1 * | 10/2009 | Gressett, Jr. ............. B05C 5/02 222/566 |
| 2009/0266844 A1 | 10/2009 | McGuffey |
| 2010/0116375 A1 | 5/2010 | Eginton et al. |
| 2011/0014369 A1 | 1/2011 | McGuffey |
| 2011/0014430 A1 | 1/2011 | Mcguffey |
| 2011/0052811 A1 | 3/2011 | McGuffey |
| 2011/0100505 A1 | 5/2011 | Jendrichowski et al. |
| 2012/0048447 A1 | 3/2012 | Burmester et al. |
| 2012/0187145 A1 | 7/2012 | Gould et al. |
| 2013/0108494 A1 | 5/2013 | Varga |
| 2014/0161504 A1 | 6/2014 | Duquet et al. |
| 2015/0017332 A1 | 1/2015 | Zolli et al. |
| 2015/0125616 A1 | 5/2015 | Trabelsi et al. |
| 2015/0190837 A1 | 7/2015 | Burmester et al. |
| 2015/0352588 A1 | 12/2015 | Lessley et al. |
| 2016/0256889 A1 | 9/2016 | Jones |
| 2016/0303597 A1 | 10/2016 | McGuffey |
| 2017/0072624 A1 | 3/2017 | Ayers |
| 2017/0097019 A1 | 4/2017 | Afshari |
| 2017/0146035 A1 | 5/2017 | Afshari |
| 2018/0065133 A1 | 3/2018 | Saine |
| 2018/0065137 A1 | 3/2018 | Saine |
| 2018/0065139 A1 | 3/2018 | Saine |
| 2018/0065140 A1 | 3/2018 | Saine et al. |
| 2018/0065142 A1 | 3/2018 | Saine |
| 2018/0252213 A1 | 9/2018 | Afshari |
| 2018/0266415 A1 | 9/2018 | Afshari |
| 2018/0291895 A1 | 10/2018 | Afshari |
| 2019/0299237 A1 | 10/2019 | Scharen et al. |

FOREIGN PATENT DOCUMENTS

| | | |
|---|---|---|
| CN | 1716023 A | 1/2006 |
| CN | 200999361 Y | 1/2008 |
| CN | 101185923 A | 5/2008 |
| CN | 101641164 A | 2/2010 |
| CN | 101711186 A | 5/2010 |
| CN | 102686321 A | 9/2012 |
| CN | 202517128 U | 11/2012 |
| CN | 202725435 U | 2/2013 |
| CN | 103089613 A | 5/2013 |
| CN | 103384569 A | 11/2013 |
| CN | 103732100 A | 4/2014 |
| CN | 103917300 A | 7/2014 |
| CN | 204412579 U | 6/2015 |
| DE | 4121792 A | 1/1993 |
| DE | 202004001480 U1 | 4/2004 |
| EP | 1442798 A2 | 8/2004 |
| EP | 1946846 A2 | 7/2008 |
| EP | 2289633 A2 | 3/2011 |
| EP | 3064279 A1 | 9/2016 |
| EP | 3064280 A1 | 9/2016 |

(56) References Cited

FOREIGN PATENT DOCUMENTS

| | | |
|---|---|---|
| JP | 08-505810 A | 6/1996 |
| JP | 09-173917 A | 7/1997 |
| JP | 09-508578 A | 9/1997 |
| JP | 10-034056 A | 2/1998 |
| JP | 2002-512121 A | 4/2002 |
| JP | 2002-361123 A | 12/2002 |
| JP | 2003-211059 A | 7/2003 |
| JP | 2004-255374 A | 9/2004 |
| JP | 2008-110343 A | 5/2008 |
| JP | 2009-028727 A | 2/2009 |
| JP | 2010-517764 A | 5/2010 |
| JP | 2010-523317 A | 7/2010 |
| JP | 2012-533412 A | 12/2012 |
| JP | 2013-503033 A | 1/2013 |
| JP | 2013-096415 A | 5/2013 |
| JP | 2019-534780 A | 12/2019 |
| KR | 20-0441757 Y1 | 9/2008 |
| WO | 93/05212 A2 | 3/1993 |
| WO | 94/23209 A1 | 10/1994 |
| WO | 99/54044 A1 | 10/1999 |
| WO | 99/54055 A1 | 10/1999 |
| WO | 2007/084891 A2 | 7/2007 |
| WO | 2011/008390 A1 | 1/2011 |
| WO | 2011/025603 A1 | 3/2011 |
| WO | 2015/057729 A2 | 4/2015 |

OTHER PUBLICATIONS (IPEA/409) International Preliminary Report on Patentability Chapter II or (IB/373) International Preliminary Report on Patentability Chapter I dated Mar. 21, 2019 for WO Application No. PCT/US17/050368.
(IPEA/409) International Preliminary Report on Patentability Chapter II or (IB/373) International Preliminary Report on Patentability Chapter I dated Mar. 21, 2019 for WO Application No. PCT/US17/050373.
(IPEA/409) International Preliminary Report on Patentability Chapter II or (IB/373) International Preliminary Report on Patentability Chapter I dated Mar. 21, 2019 for WO Application No. PCT/US17/050380.
(IPEA/409) International Preliminary Report on Patentability Chapter II or (IB/373) International Preliminary Report on Patentability Chapter I dated Mar. 21, 2019 for WO Application No. PCT/US17/050406.
(IPEA/409) International Preliminary Report on Patentability Chapter II or (IB/373) International Preliminary Report on Patentability Chapter I dated Mar. 21, 2019 for WO Application PCT/US17/050406.
(IPEA/409) International Preliminary Report on Patentability Chapter II or (IB/373) International Preliminary Report on Patentability Chapter I dated Mar. 21, 2019 for WO Application PCT/US17/050509.
English Translation of International Preliminary Report on Patentability Chapter II or English Translation of International Preliminary Report on Patentability Chapter I dated Dec. 13, 2018 for WO Application PCT/US17/050417.
English Translation of International Preliminary Report on Patentability Chapter II or English Translation of International Preliminary Report on Patentability Chapter I dated Mar. 21, 2019 for WO Application PCT/US17/050368.
English Translation of International Preliminary Report on Patentability Chapter II or English Translation of International Preliminary Report on Patentability Chapter I dated Mar. 21, 2019 for WO Application No. PCT/US17/050373.
International Patent Application No. PCT/US2017/050406; Int'l Search Report and the Written Opinion; dated Mar. 19, 2018; 19 pages.
ISA/206—Invitation to Pay Additional Fees dated Jan. 5, 2018 for WO Application No. PCT/US17/50406.
ISA/220—Notification of Transmittal or Search Report and Written Opinion of the ISA, or the Declaration dated Dec. 20, 2017 for WO Application No. PCT/US17/050368.
ISA/220—Notification of Transmittal or Search Report and Written Opinion of the ISA, or the Declaration dated Dec. 20, 2017 for WO Application No. PCT/US17/050373.
ISA/220—Notification of Transmittal or Search Report and Written Opinion of the ISA, or the Declaration dated Jan. 8, 2018 for WO Application No. PCT/US 17/050380.
ISA/220—Notification of Transmittal or Search Report and Written Opinion of the ISA, or the Declaration dated Jan. 8, 2018 for WO Application PCT/US17/050380.

* cited by examiner

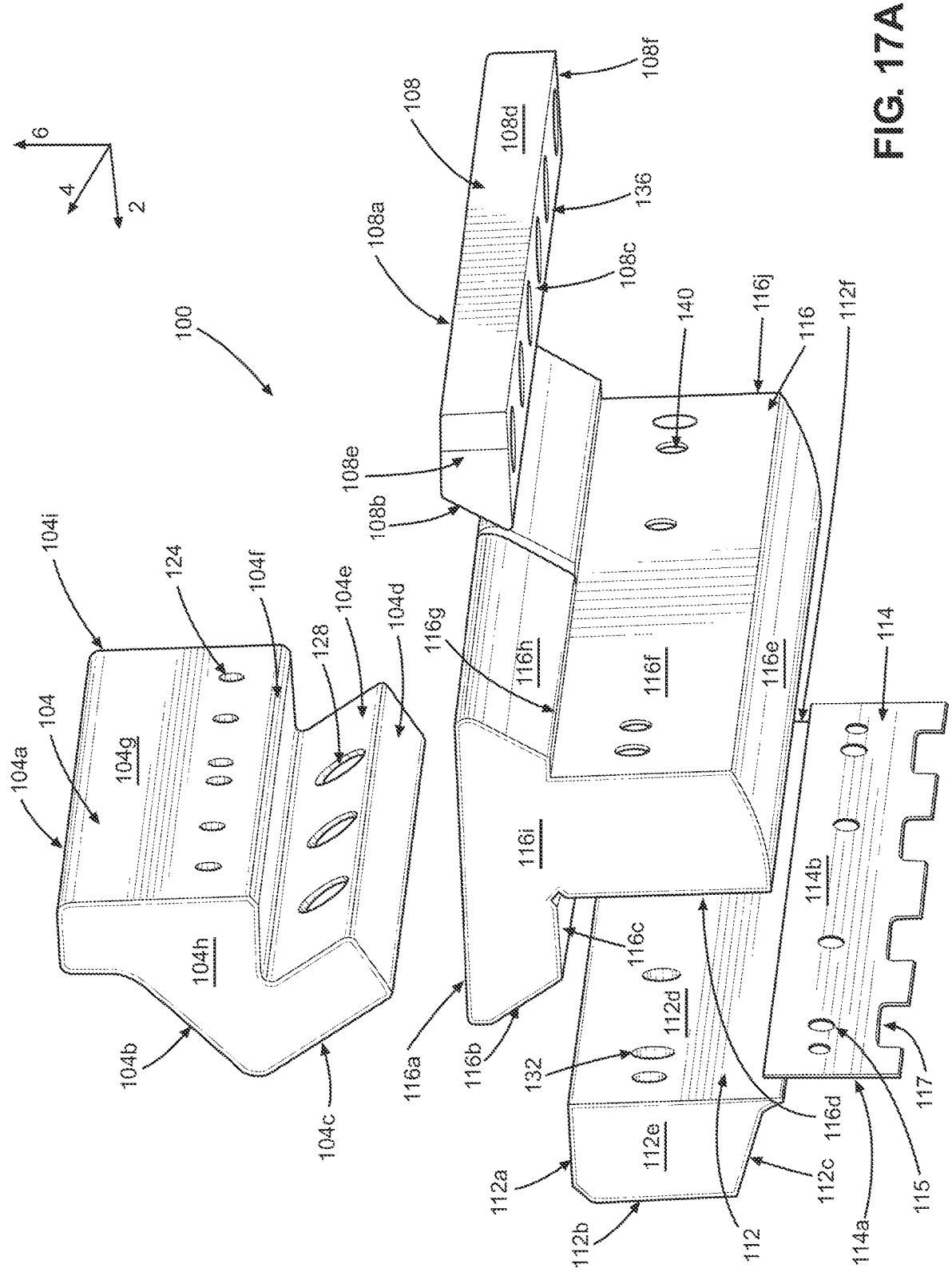

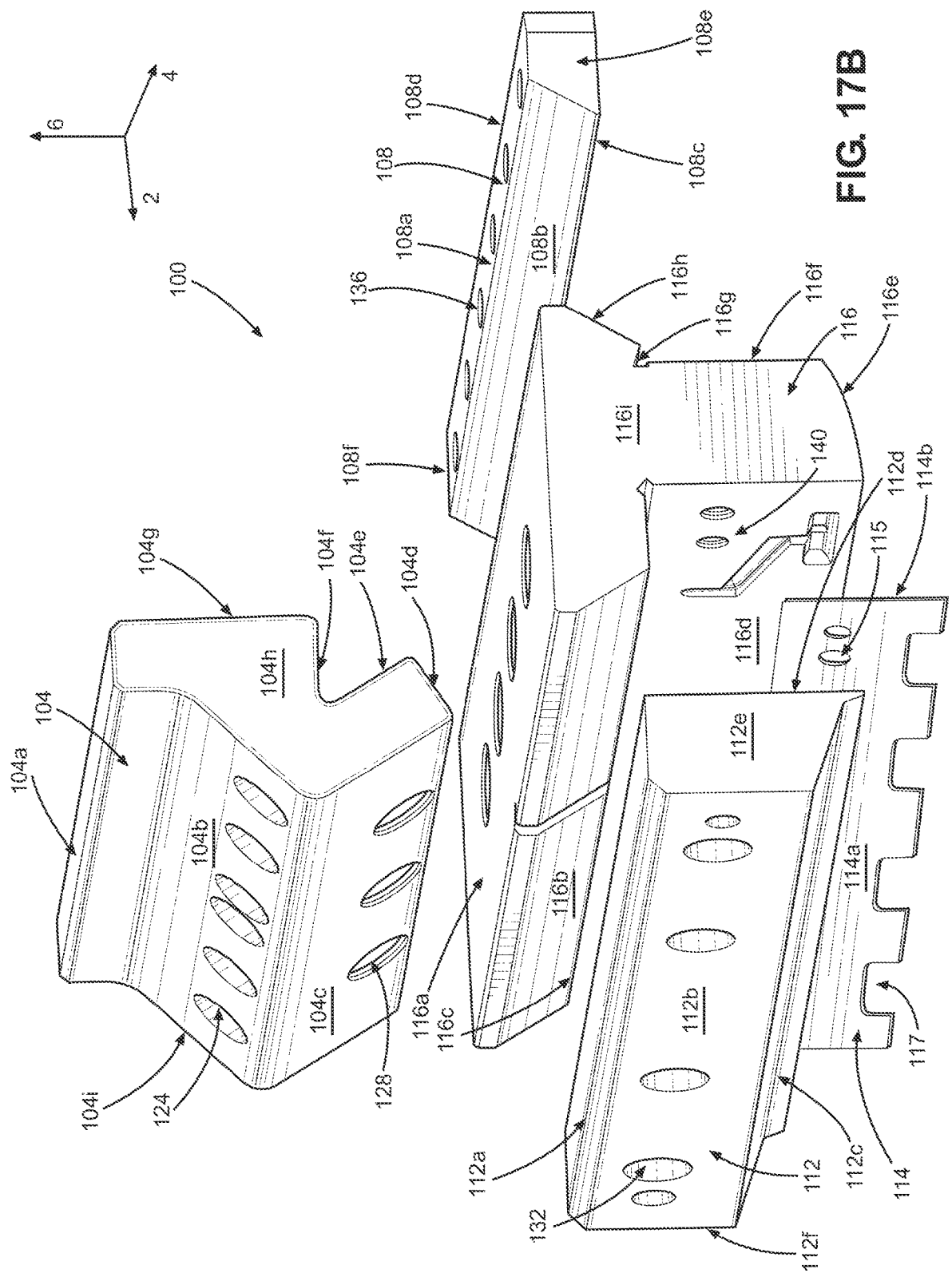

ADHESIVE DISPENSING SYSTEM WITH CONVERTIBLE NOZZLE ASSEMBLIES

CROSS REFERENCE TO RELATED APPLICATIONS

This application is a continuation of U.S. patent application Ser. No. 17/066,610, filed Oct. 9, 2020, which is a divisional of U.S. patent application Ser. No. 15/698,086, filed Sep. 7, 2017, which claims the benefit of U.S. Provisional Patent Application No. 62/385,238, filed Sep. 8, 2016, the entire disclosures of which are hereby incorporated by reference as if set forth in their entirety herein.

TECHNICAL FIELD

The present invention relates to an applicator for applying an adhesive onto a substrate and having a manifold with surfaces for selectively attaching multiple types of nozzle assemblies.

BACKGROUND

Applicators for dispensing adhesive may include a nozzle that is designed for a particular type of adhesive dispensing operation. Typically, when a manufacturer wants to perform a new type of adhesive dispensing operation, the manufacturer must purchase a completely separate applicator that is compatible with the nozzle suited for the particular purpose. In addition to significantly increasing production costs, as replacing an entire applicator assembly can be expensive, the time and effort required to completely remove an entire applicator from a manufacturing line and replace it with a new applicator can be extensive.

Therefore, there is a need for an applicator for dispensing adhesive that is designed to be compatible with interchangeable types of nozzle assemblies.

SUMMARY

The present invention includes a manifold for a liquid adhesive dispensing system. The manifold includes a body having a first contact surface that engages a first clamp and a second contact surface that engages a second clamp and a nozzle. The first and second clamps secure the nozzle to the body of the manifold, and the second contact surface is angularly offset from the first contact surface.

The present invention also includes an adhesive dispensing system for applying liquid adhesive to a substrate. The adhesive dispensing system includes a manifold having a body, a first clamp engaging the body of the manifold, a second clamp engaging the body of the manifold, and a nozzle. The first and second clamps secure the nozzle to the body of the manifold.

BRIEF DESCRIPTION OF THE DRAWINGS

The foregoing summary, as well as the following detailed description, will be better understood when read in conjunction with the appended drawings. The drawings show illustrative embodiments of the invention. It should be understood, however, that the application is not limited to the precise arrangements and instrumentalities shown.

FIG. 17A is an exploded view of the first nozzle assembly shown in FIG. 14;

FIG. 17B is an alternative exploded view of the first nozzle assembly shown in FIG. 14;

DETAILED DESCRIPTION OF ILLUSTRATIVE EMBODIMENTS

Figure 1:
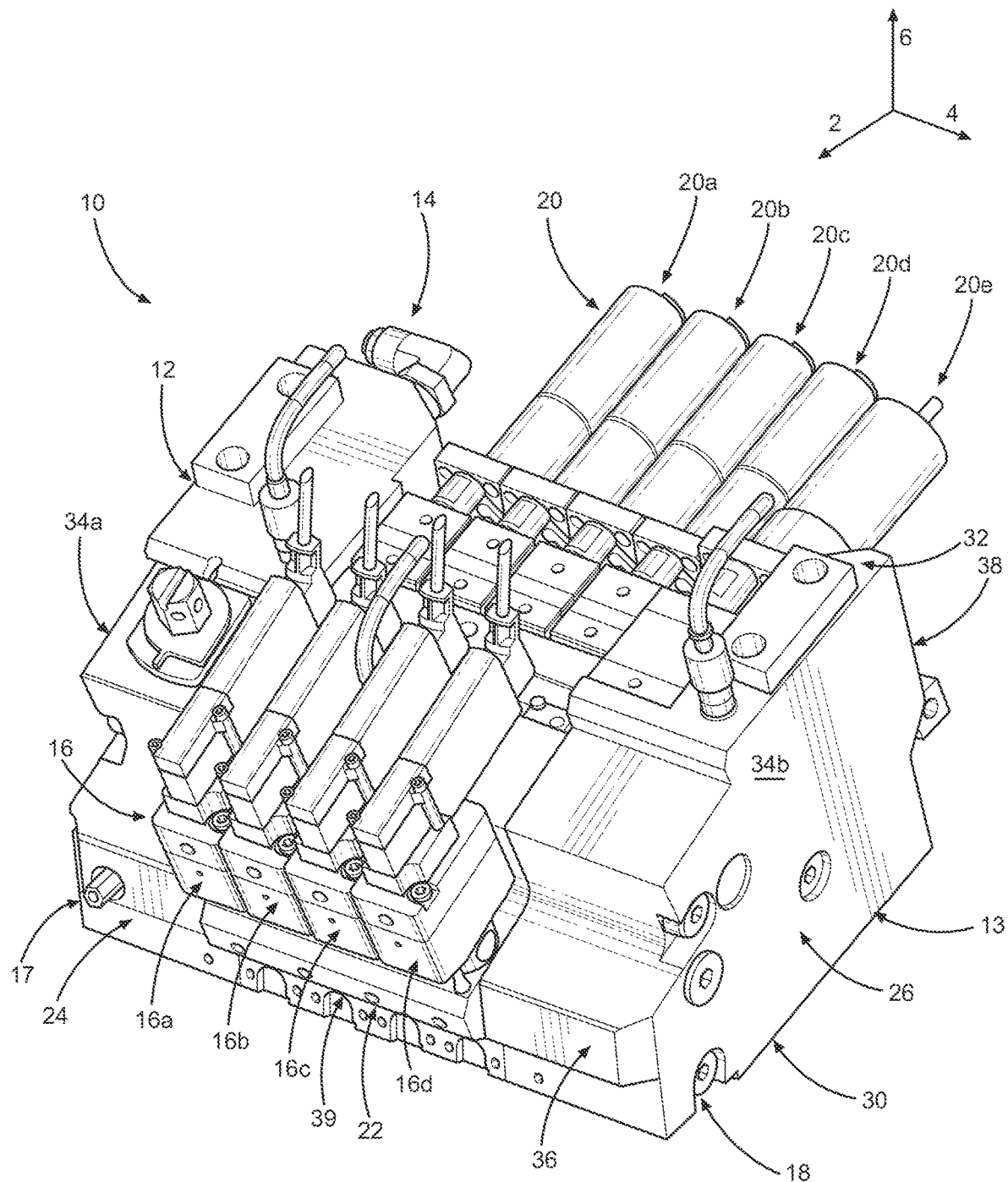
FIG. 1 is a front perspective view of an applicator according to an embodiment of the present invention.

Described herein is an applicator 10 that includes a manifold 12 that is compatible with different nozzles. The manifold 12 defines a body 13 that defines a first contact surface 39 and a recess 18 defined by a second contact surface 18a and a third contact surface 18b. The first, second, and third contact surfaces 39, 18a, and 18b are configured to interchangeably engage multiple types of nozzle assemblies, such as a first nozzle assembly 100 and a second nozzle assembly 200. Certain terminology is used to describe the applicator 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the applicator 10 and related parts thereof. The words "forward" and "rearward" refer to directions in a longitudinal direction 2 and a direction opposite the longitudinal direction 2 along the applicator 10 and related parts thereof. The terminology includes the above-listed words, derivatives thereof, and words of similar import.

Unless otherwise specified herein, the terms "longitudinal," "vertical," and "lateral" are used to describe the orthogonal directional components of various components of the applicator 10, as designated by the longitudinal direction 2, lateral direction 4, and vertical direction 6. It should be appreciated that while the longitudinal and lateral directions 2 and 4 are illustrated as extending along a horizontal plane, and the vertical direction 6 is illustrated as extending along a vertical plane, the planes that encompass the various directions may differ during use.

Embodiments of the present invention include an applicator 10 for dispensing adhesive onto a substrate during product manufacturing. Referring to FIGS. 1-6, the applicator 10 includes a manifold 12. The applicator 10 has a top surface 32, a bottom surface 30 opposite the top surface 32 along the vertical direction 6, a first side surface 34a, a second side surface 34b opposite the first side surface 34a along the lateral direction 4, a front surface 36, and a back surface 38 opposite the front surface 36 along the longitudinal direction 2. The first and second side surfaces 34a and 34b extend from the front surface 36 to the back surface 38, as well as from the bottom surface 30 to the top surface 32. The manifold 12 includes a body 13 that is defined by a first end plate 24, a second end plate 26, and at least one manifold segment 22 disposed between the first and second end plates 24 and 26. As a result, the first and second end plates 24 and 26 are spaced apart along the lateral direction 4. The first and second end plates 24 and 26 and the manifold segment 22 may be releasably connected such that additional manifold segments 22 may be added or taken away from the applicator 10 as operating conditions require. As a result, even though FIGS. 1-5 show applicator 10 as including one manifold segment 22, applicator 10 can include more manifold segments 22 as desired. However, in another embodiment, the manifold 12 may be a unitary manifold.

Figure 2:
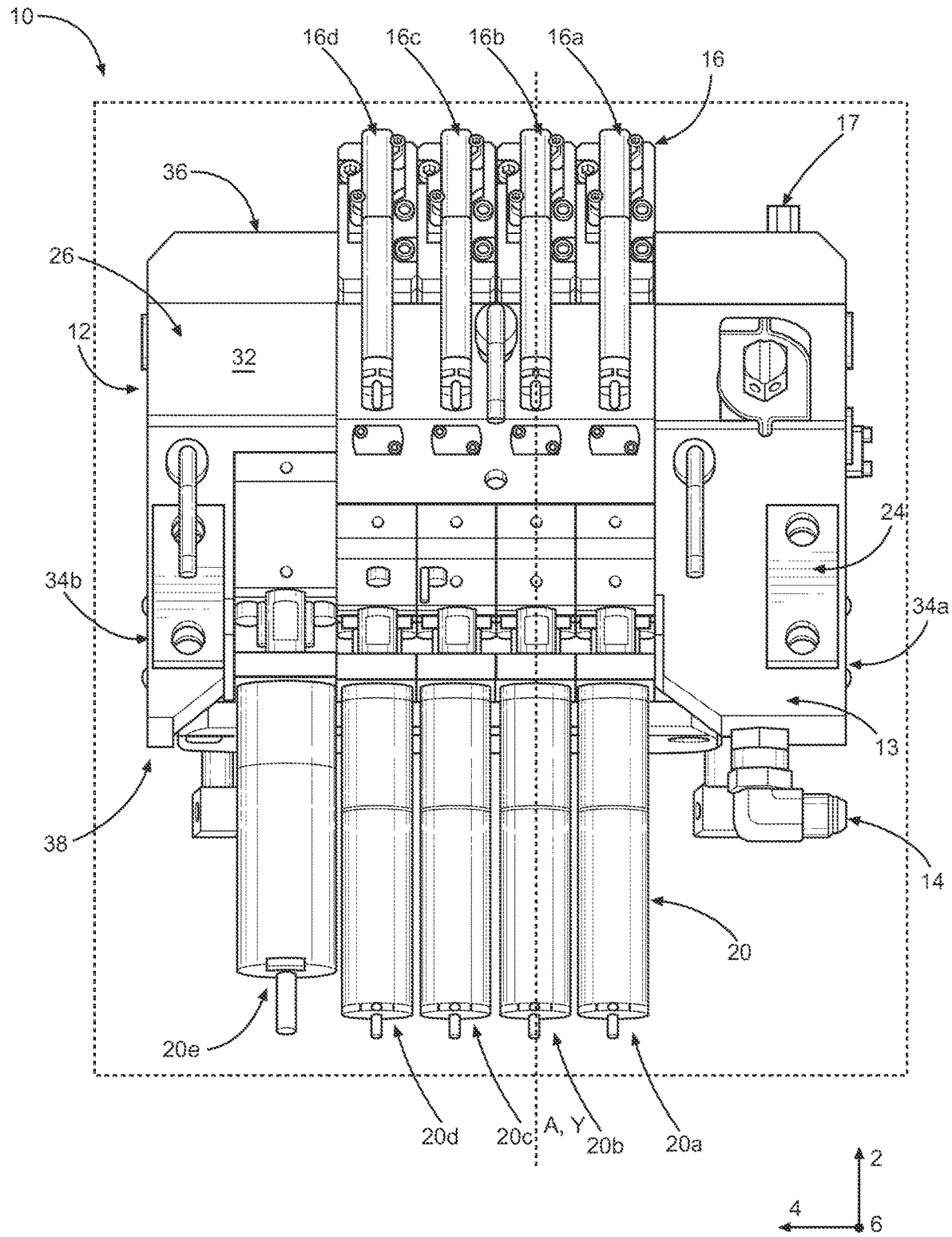
FIG. 2 is a top view of the applicator shown in FIG. 1.
Figure 3:
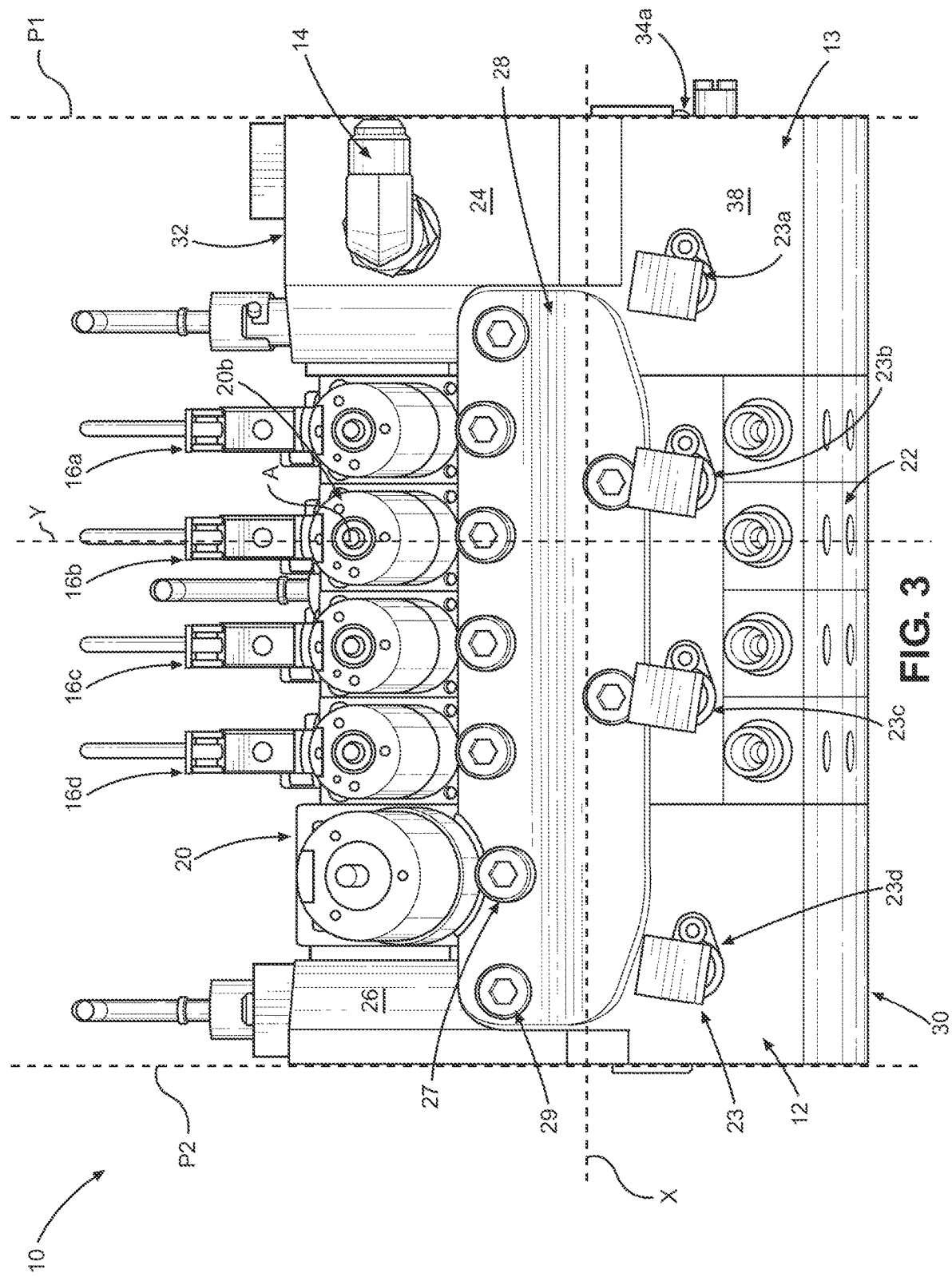
FIG. 3 is a rear view of the applicator shown in FIG. 1.
Figure 4:
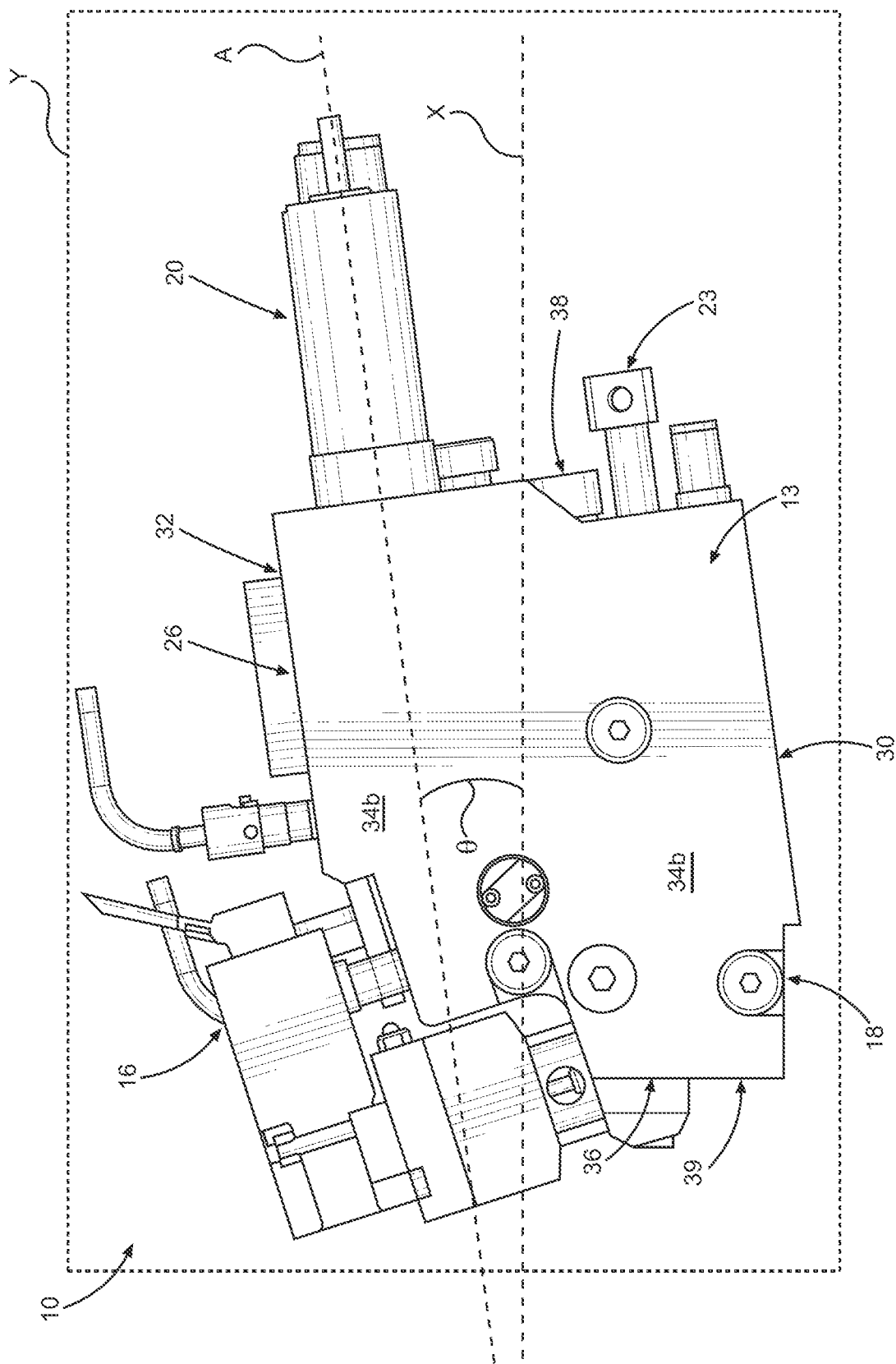
FIG. 4 is a side view of the applicator shown in FIG. 1.
Figure 5:
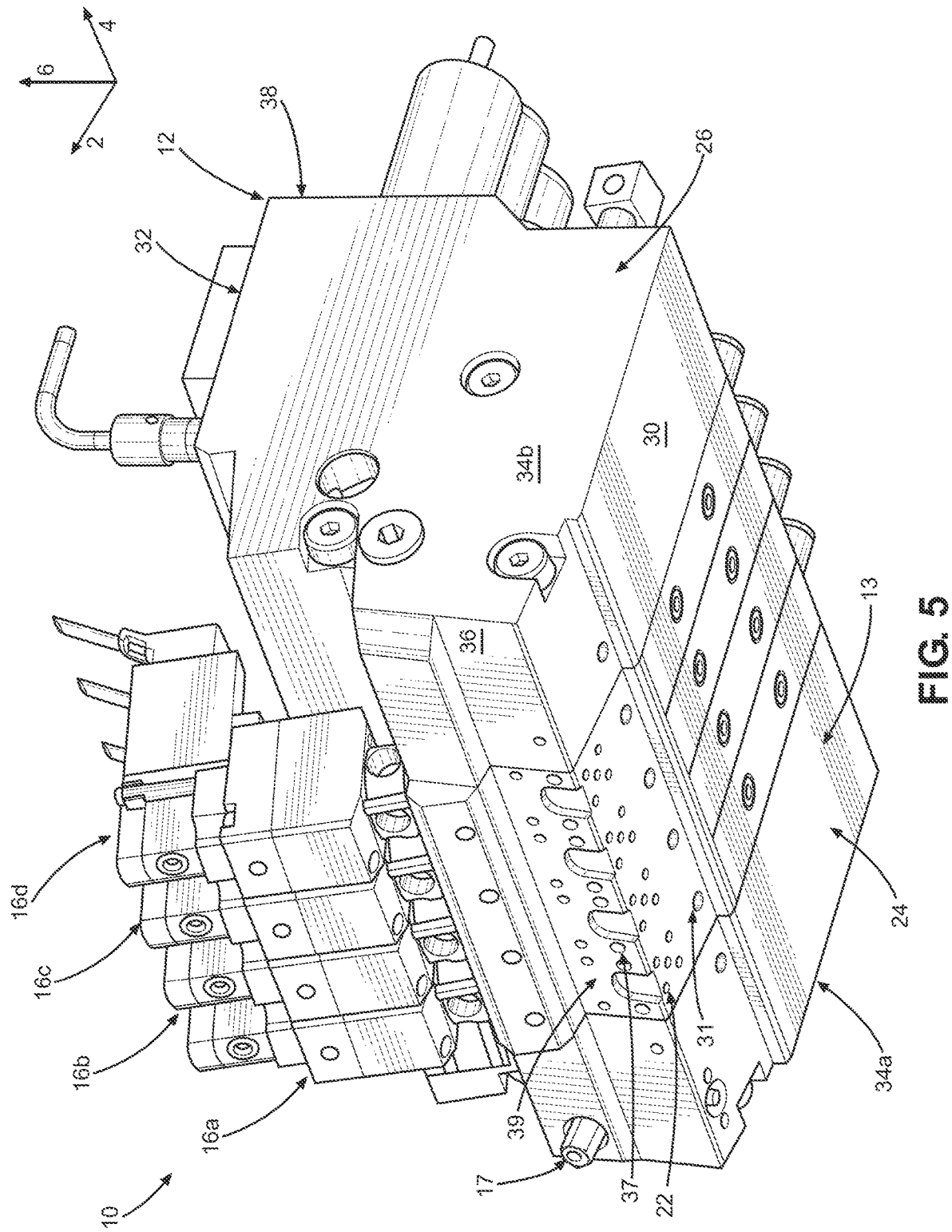
FIG. 5 is a bottom perspective view of the applicator shown in FIG. 1.
Figure 6:
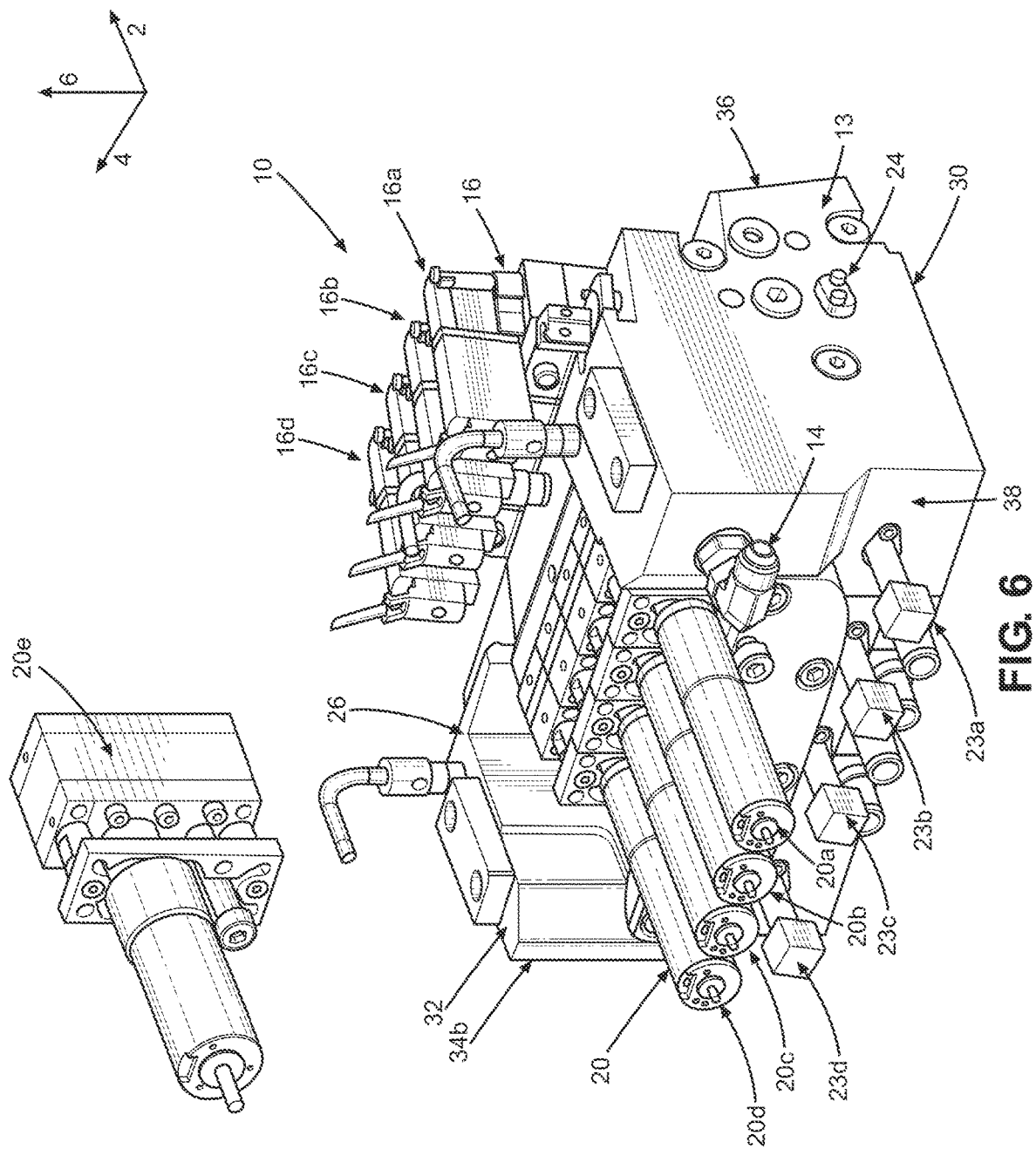
FIG. 6 is a rear perspective view of the applicator shown in FIG. 1, with a pump assembly removed from the applicator.
Figure 7:
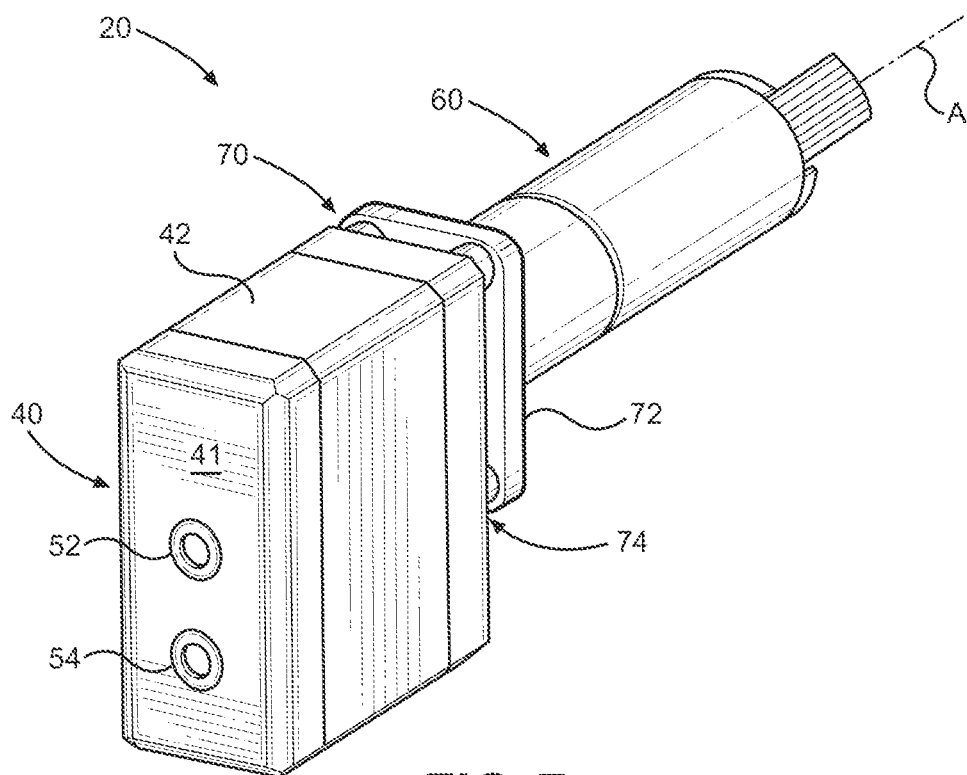
FIG. 7 is a bottom perspective view of a pump assembly used in the applicator shown in FIG. 1.
Figure 8:
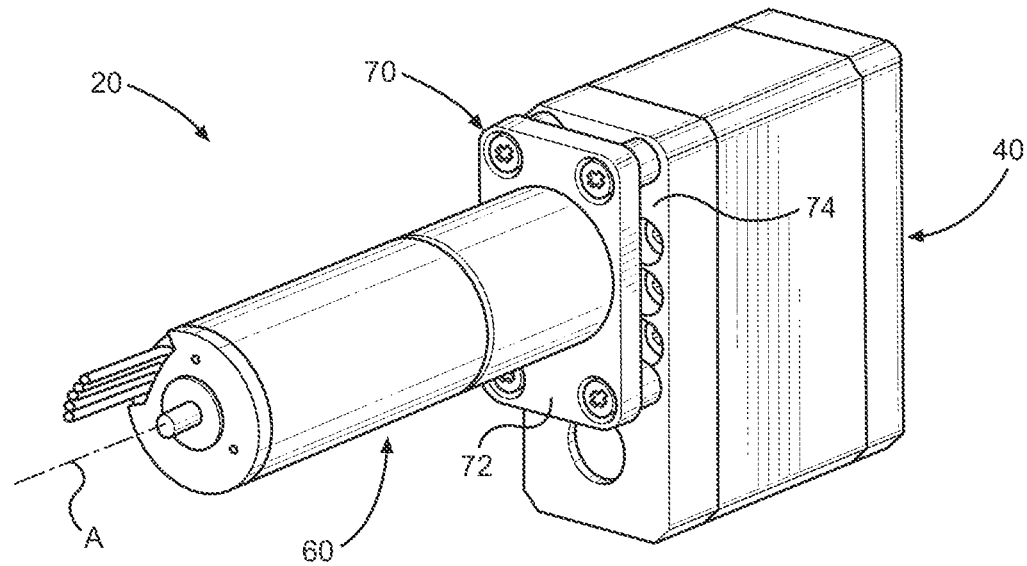
FIG. 8 is a top perspective view of the pump assembly shown in FIG. 7.
Figure 9:
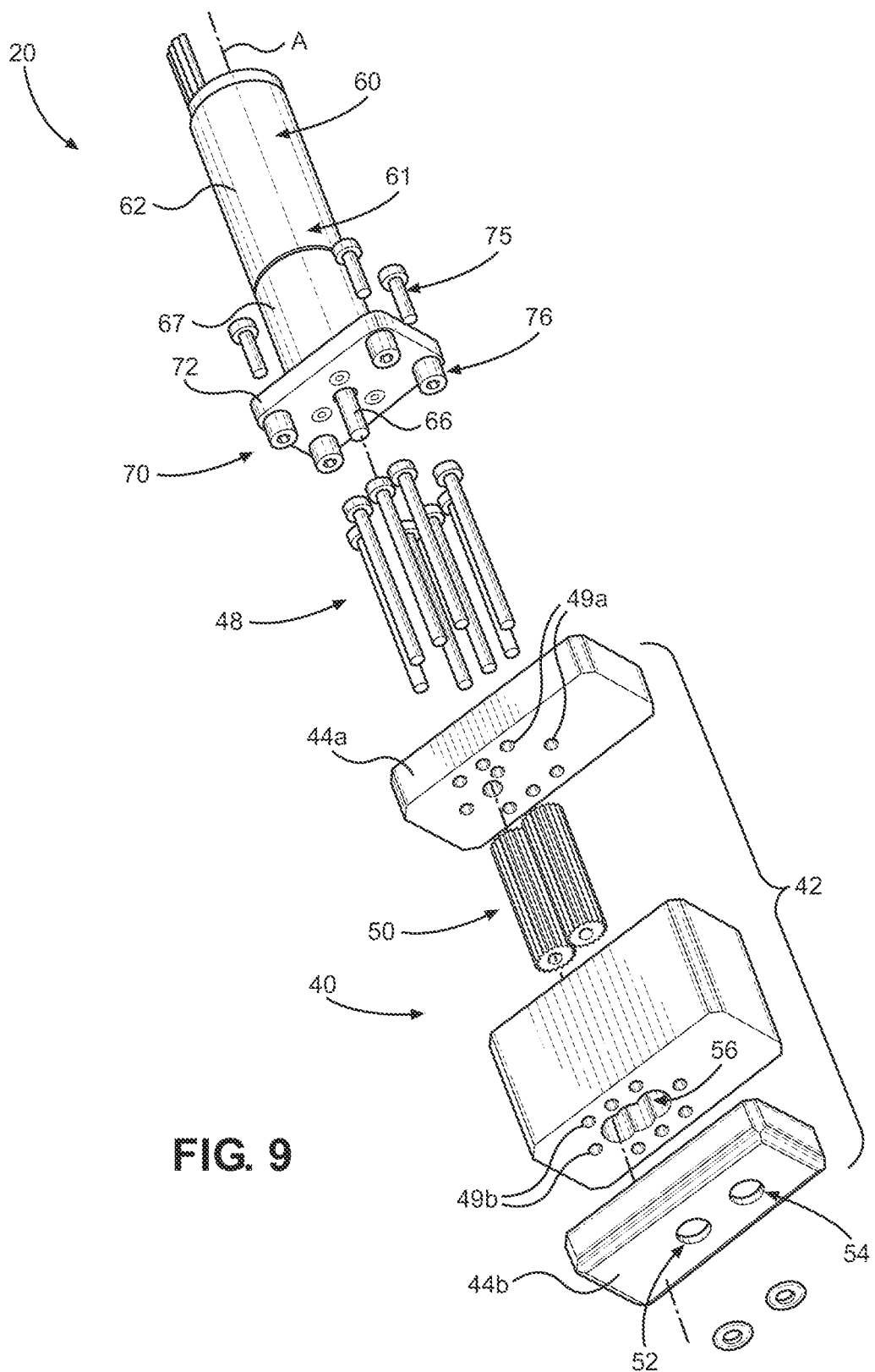
FIG. 9 is an exploded view of the pump assembly shown in FIG. 7.

Referring to FIGS. 2-4, the first side surface 34a of the manifold 12 lies within a first plane P1, while the second side surface 34b lies within a second plane P2. The second plane P2 may be parallel to the first plane P1. However, the first and second planes P1 and P2 may not be parallel if the first and second side surfaces 34a and 34b are angled with respect to each other. The applicator 10 defines a horizontal plane X, such that the longitudinal and lateral directions 2 and 4 lie within the horizontal plane X. The pump assembly 20 may define a drive shaft axis A that lies within a plane Y. The interrelationship of these planes and axes will be described further below.

The applicator 10 also defines features that allow for different nozzle assemblies 100 or 200 to be removably attached to the manifold 12, as will be described below. The body 13 of the manifold 12 defines a first contact surface 39, as well as bores 37 that extend into the manifold 12 from the first contact surface 39. The bores 37 may receive fasteners that secure portions of a first or second nozzle assembly 100 or 200 to the manifold 12, such as a first clamp 104 or 204. Any number of bores 37 can be included in the manifold 12, depending on the specific range of nozzle assemblies that may be used with the manifold 12. Though the front surface 36 is depicted as including the first contact surface 39, the first contact surface 39 may also be spaced from the front surface 36 as desired. For example, the first contact surface 39 can be spaced from the front surface 36 along the longitudinal direction 2.

Further, the manifold 12 can define a recess 18 that extends into the manifold 12 from the bottom surface 30 along the vertical direction 6. The recess 18 can also extend into the manifold 12 from the front surface 36 along the longitudinal direction 2. The recess 18 can further extend from the first side surface 34a to the second side surface 34b. The recess 18 is configured to receive features of nozzle assemblies 100 and 200, as described further below. The manifold 12 can define a second contact surface 18a and a third contact surface 18b, where the second contact surface 18a extends from the first contact surface 39 to the second side surface 34b, and the third contact surface 18b extends from the second contact surface 18a to the bottom surface 30, and each of the second and third contact surfaces 18a and 18b partially define the recess 18. The first contact surface 39 can be angularly offset from the second contact surface 18a, and the second contact surface 18a can be angularly offset from the third contact surface 18b. In one embodiment, the second contact surface 18a is substantially perpendicular to the third contact surface 18b. Like the first contact surface 39, the second contact surface 18a can include bores 31 that extend from the second contact surface 18a into the manifold 12 and are configured to receive fasteners that secure a portion of nozzle assemblies 100 and 200 to the manifold 12, such as the second clamp 108. The second contact surface 18a can be spaced from the bottom surface 30 of the manifold 12 along the vertical direction 6.

Continuing with FIGS. 1-6, the applicator 10 includes an input connector 14, through which adhesive is pumped into the manifold 12. The manifold 12 may further include a pressure release valve 17 that allows a user to attenuate pressure created by adhesive within the manifold, and a dispensing module 16 for applying the adhesive to a substrate. When the pressure release valve 17 is opened, adhesive may drain from the manifold through a drain (not shown). The applicator 10 also includes a pump assembly 20 removably mounted to the manifold 12. The pump assembly 20 pumps adhesive flowing from an interior channel of the manifold 12 to the dispensing module 16, which then dispenses adhesive out of the applicator through a first or second nozzle assembly 100 or 200, which will be discussed further below. The applicator 10 may include thermal elements 23 that are configured to elevate the temperature of the manifold 12, which, in turn, elevates the temperature of the pump 40 in each pump assembly 20. Though FIGS. 1-6 depict the applicator 10 as including four thermal elements 23a-23d, any number of thermal elements 23 can be included as required.

In various embodiments, the applicator 10 includes multiple sets of pump assemblies 20 and dispensing modules 16. As illustrated in FIGS. 1-6, for example, the applicator 10 is depicted as including five pump assemblies 20a, 20b, 20c, 20d, and 20e. Although FIGS. 1-6 illustrate five pump assemblies 20a-20e, the applicator 10 can include any number of pump assemblies 20 as desired. For example, the applicator 10 can include two pump assemblies, three pump assemblies, or more than three pump assemblies. The pump assemblies 20a-20e may be arranged in a side-by-side configuration to increase the processing width of the applicator 10. For clarity, a single pump assembly 20 is described below. However, reference number 20 can be used interchangeably with reference numbers 20a-20e. Though the pump assemblies 20a-20d are depicted as being similarly sized, and pump assembly 20e is depicted as larger than pump assemblies 20a-20d, each of the individual pump assemblies 20 included in the applicator 10 can be individually sized as desired to suit a particular purpose.

Additionally, the applicator 10 is depicted as including four dispensing modules 16a, 16b, 16c, and 16d. Although FIGS. 1-6 illustrate four dispensing modules 16a-16d, the applicator 10 can include any number of dispensing modules 16 as desired. For example, the applicator 10 can include one dispensing module, two dispensing modules, or more than two dispensing modules. Similarly, a single dispensing module 16 is described below. However, the reference number 16 can be used interchangeably with reference numbers 16a-16d.

Continuing with FIGS. 1-6, each of pump assemblies 20a-20e may be associated with a corresponding one of the dispensing modules 16a-16e. In operation, each of pump assemblies 20a-20e may pump fluid that is supplied by the manifold 12 to the corresponding one of the dispensing modules 16a-16d, such that the dispensing modules 16a-16d apply the adhesive to a given substrate. However, each dispensing module 16 may not correspond to a single pump assembly 20, such that multiple pump assemblies 20 pump adhesive to a single dispensing module 16.

Referring to FIGS. 7-11, each pump assembly 20a-20e includes a pump 40 and a dedicated drive motor unit 60 that powers the pump 40. Because each pump 40 has a dedicated drive motor unit 60, each pump assembly 20 can be independently controlled by the operator and/or a control system (not shown). The pump assembly 20 also includes a thermal isolation region 70 positioned between the pump 40 and the drive motor unit 60. Thermal elements 23 may be used to elevate the temperature of the manifold 12, which, in turn, elevates the temperature of the pump 40 in each pump assembly 20. The thermal isolation region 70 minimizes thermal transfer from the pump 40 to the drive motor unit 60, thereby minimizing the effect of temperature on the electronic components in the drive motor unit 60. Exposing the electronic components in the drive motor unit 60 to a sufficiently elevated temperature may damage the electronic components, which may render the drive motor unit 60 inoperable.

The drive motor unit 60 includes a motor 62, an output drive shaft 66, and one or more connectors (not shown) that are coupled to a power source (not shown). The drive motor unit 60 is coupled to a gear assembly 67, which may include any type of gears as desired that transfer rotational motion from an output drive shaft 66 of the motor to the input drive shaft (not shown) of the pump to attain the desired rotational speed. In one embodiment, the gear assembly 67 includes a planetary gear train. The output drive shaft 66 has a drive axis A about which the drive shaft 66 rotates.

Referring back to FIGS. 3 and 4, the pump assembly 20 may be mounted to the manifold 12 in a number of different configurations. In one embodiment, the pump assembly 20 is mounted to the manifold 12 so that the bottom surface 41 of the pump 40, which includes an inlet 52 and an outlet 54, faces the manifold 12 at a location that is spaced apart from and located between the first and second side surfaces 34a and 34b. In this configuration, the drive motor axis A does not intersect either the first side surface 34a or the second side surface 34b of the applicator 10. Rather, the pump assembly 20 is positioned on the manifold 12 such that the drive motor axis A of the drive motor unit 60 may lie in a plane Y that is parallel to the first plane P1, in which the first side surface 34a lies, as described above. The plane Y may also be parallel to the second plane P2, in which the second side surface 34b lies. Each pump assembly 20a-20e has a respective axis A that lies within a respective plane that may be parallel to the first plane P1 and/or the second plane P2.

Continuing with FIGS. 3 and 4, the pump assembly 20 is positioned on the manifold 12 such that the drive motor axis A is oriented in any particular direction within plane Y. For example, the pump assembly 20 can be positioned on the manifold 12 such that the drive motor axis A lies within plane Y and is angularly offset with respect to plane X. For instance, the pump assembly 20 can be positioned on the manifold 12 such that the drive motor axis A defines an angle θ with respect to plane X. The angle θ can be any angle as desired. In one embodiment, the angle θ is an acute angle. Alternatively, the angle θ can be an obtuse angle, an angle greater than 180 degrees, or substantially 90 degrees.

Referring to FIGS. 7-11, the pump 40 includes a housing assembly 42 and a gear assembly 50 contained within the housing assembly 42. Alternatively, more than one gear assembly 50 may be contained within the housing assembly 42. The housing assembly 42 further includes an inlet 52 that is configured to receive adhesive from the manifold segment 22, as well as an outlet 54 for discharging adhesive back into the manifold assembly 22. In accordance with the embodiment illustrated in FIGS. 7-11, the inlet 52 and the outlet 54 of the pump 40 are defined by a bottom surface 41 of the pump 40 and are oriented in a direction that is parallel to the drive motor axis A of the drive motor unit 60.

The housing assembly 42 comprises an upper plate 44a, a lower plate 44b, and a central block 46. The upper and lower plates 44a and 44b are spaced from each other along a direction that is aligned with a drive axis A of the drive motor unit 60. The lower plate 44b defines a bottom surface 41, through which the drive axis A may extend. The upper plate 44a, the central block 46, and the lower plate 44b are coupled together with bolts 48. The upper plate 44a has a plurality of bores 49a that are configured to receive the bolts 48, the central block 46 has a plurality of bores 49b that are configured to receive the bolts 48, and the lower plate 44b has a plurality of bores (not shown) that are configured to receive the bolts 48. The bolts 48, bores 49a, and bores 49b may be threaded, such that the bores 49a-49b are capable of threadedly receiving the bolts 48.

Figure 10:
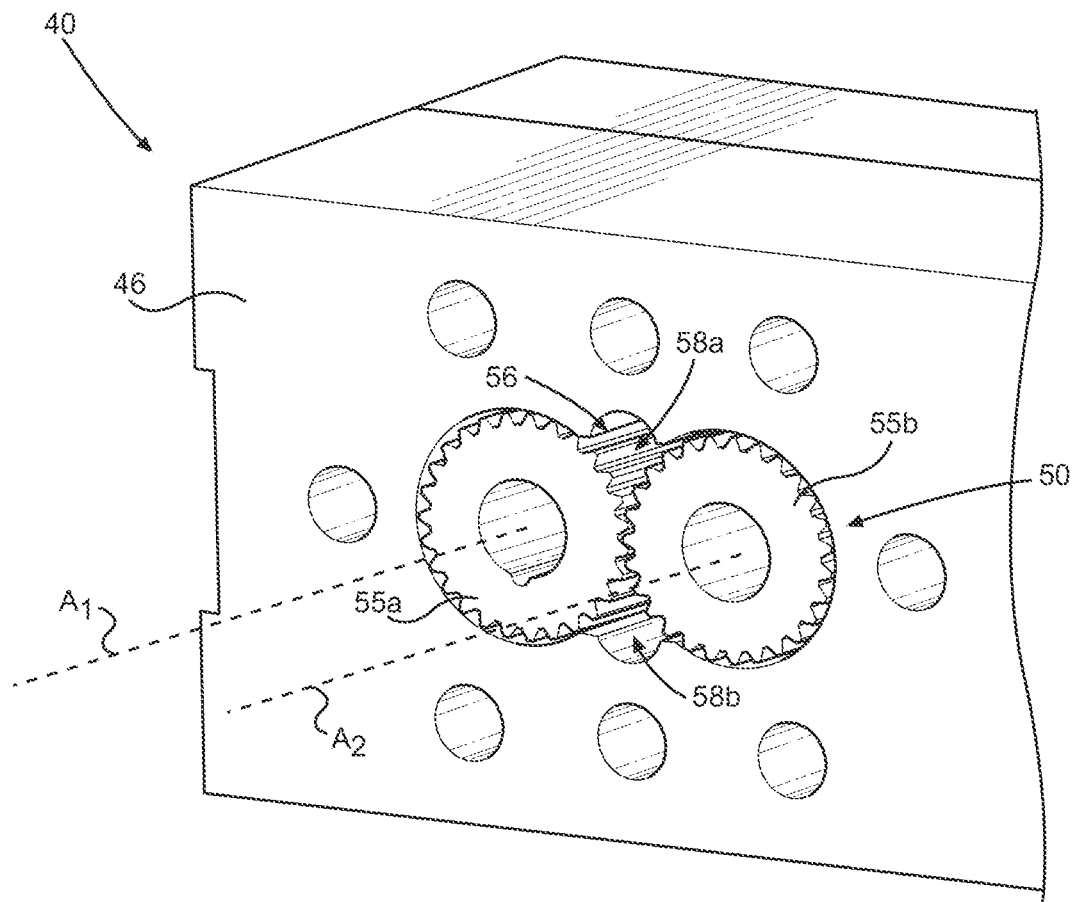
FIG. 10 is a sectional view of the pump assembly shown in FIG. 7.
Figure 11:
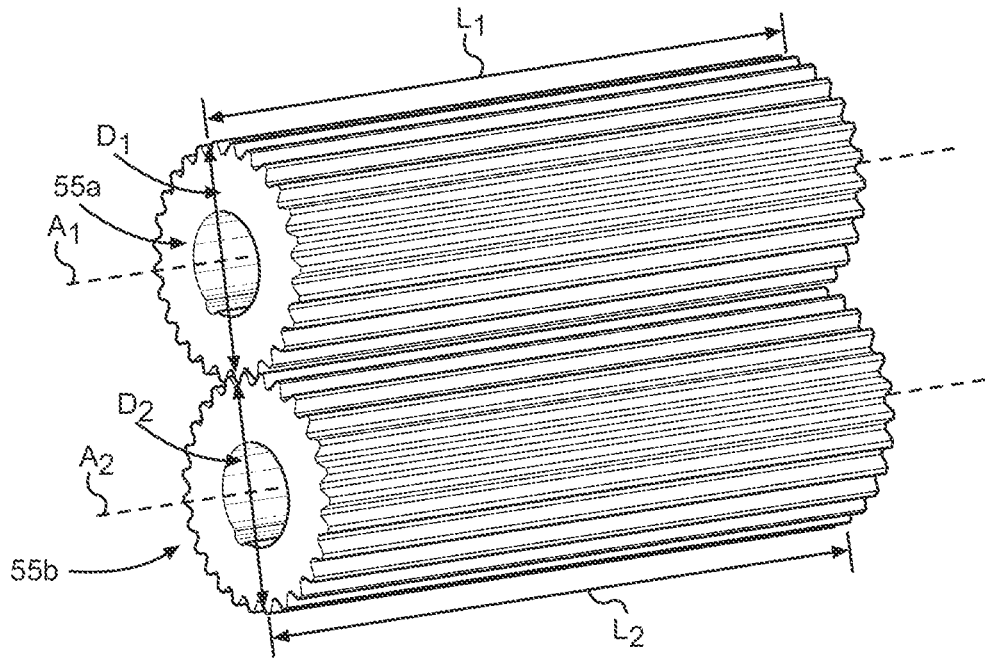
FIG. 11 is a perspective view of a gear assembly used in the pump assembly shown in FIGS. 7-10.

The central block 46 has an internal chamber 56 that is sized to generally conform to the profile of the gear assembly 50. In one embodiment, the gear assembly 50 includes a driven gear 55a and an idler gear 55b, which are known to a person of ordinary skill in the art. The driven gear 55a is coupled to the output drive shaft 66 of the drive motor unit 60 such that rotation of the drive shaft 66 rotates the driven gear 55a, which, in turn, rotates the idler gear 55b. The driven gear 55a rotates about a first axis $A_1$, while the idler gear 55b rotates about a second axis $A_2$. In FIG. 10, the first axis $A_1$ is illustrated as coaxial with the drive motor axis A. However, it is also contemplated that the first axis $A_1$ may be offset from the drive motor axis A. The gear assembly 50 may include an elongate gear shaft (not shown) that is coupled to an end of the output drive shaft 66 via a coupling (not shown). The gear shaft can extend into the driven gear 55a, and cab be keyed to actuate the driven gear 55a. A seal member (not shown), such as a coating and/or an encasement, can be placed around the elongate gear shaft to facilitate sealing of the gear assembly 50 and internal chamber 56.

In use, rotation of the driven gear 55a and the idler gear 55b drives adhesive in the pump 40 from a first section 58a of the internal chamber 56 to a second section 58b of the internal chamber 56. The adhesive is then routed from the second section 58b of the internal chamber 56 to the outlet 54. In accordance with the illustrated embodiment, the driven gear 55a has a diameter $D_1$ and a length $L_1$, where the length $L_1$ may be greater than the diameter $D_1$. Likewise, the idler gear 55b has a diameter $D_2$ and a length $L_2$, where the length $L_2$ may be greater than the diameter $D_2$. While a gear assembly 50 with two gears is shown, the pump can have a gear assembly that has any number of gear configurations to produce the desired flow rate of adhesive through the pump 40. In these configurations, the central block 46 can be segmented to support gear stacking. In one embodiment, a plurality of gear assemblies (not shown) can be stacked along the pump input shaft. In this embodiment, the gear assemblies can have different outputs that are combined into a single output stream. In another embodiment, the gear assemblies have different outputs that can be kept separate to provide multiple outputs through additional porting in the lower plate 44b and the manifold 12.

Continuing with FIGS. 7-11, the thermal isolation region 70 is defined by a thermal isolation plate 72 and a gap 74 that extends from the thermal isolation plate 72 to the housing assembly 42. The pump assembly 20 includes bolts 75 that couple the thermal isolation plate 72 to the top of the housing assembly 42 so that the gap 74 is formed between the housing assembly 42 and the thermal isolation plate 72. The thermal isolation plate 72 can include a plurality of spacers 76 that are disposed around the bolts 75 and are positioned between a surface of the thermal isolation plate 72 and the upper plate 44a of the housing assembly 42. The spacers 76 may be monolithic with the thermal isolation plate 72, or may be separable from the thermal isolation plate 72 such that the gap 74 may be adjustable. The spacers 76 may extend inward from the upper plate 44a to ensure the motor output shaft 66 and the driven gear 55a are aligned. The thermal isolation plate 72 functions to inhibit the transfer of heat from the pump 40 to the drive motor unit 60. To do this, the thermal isolation plate 72 and the spacers 76 are made of a material that has a lower thermal conductivity than the adhesives that form the components of the housing assembly 42 and an outer casing 61 of the drive motor unit 60. Furthermore, the spacers 76 separate the thermal isolation plate 72 and the housing assembly 42 such that the thermal isolation plate 72 and the housing assembly 42 has the gap 74, which minimizes direct contact between the housing assembly 42 and the drive motor unit 60.

Referring to FIG. 3, each of the pump assemblies 20a-20e is removably attached to the manifold 12. In one embodiment, each pump assembly 20 is secured to a plate 28 via a fastener 27. The plate 28 is attached at one end to the first end plate 24 via a fastener 29, and at the opposite end to the second end plate 26 via another fastener 29. The fasteners 29 can also attach the plate 28 to the manifold segment 22. Fasteners 27 may be threaded, such that removing a pump assembly 20 from the manifold 12 requires unscrewing a fastener 27 from the pump assembly 20 and removing the pump assembly 20 from the manifold 12. However, other methods of releasably attaching the pump assemblies 20 to the manifold 12 are contemplated, such as a slot and groove system, snap fit engagement, etc. Because the pump assemblies 20 may be releasably coupled to the manifold 12 in the above manner, a particular pump assembly 20 may be individually replaced without completely disassembling the entire applicator 10. Pump assemblies 20 may require replacement for a variety of reasons, including cleaning, damage, or changed adhesive pumping conditions or requirements.

Figure 12:
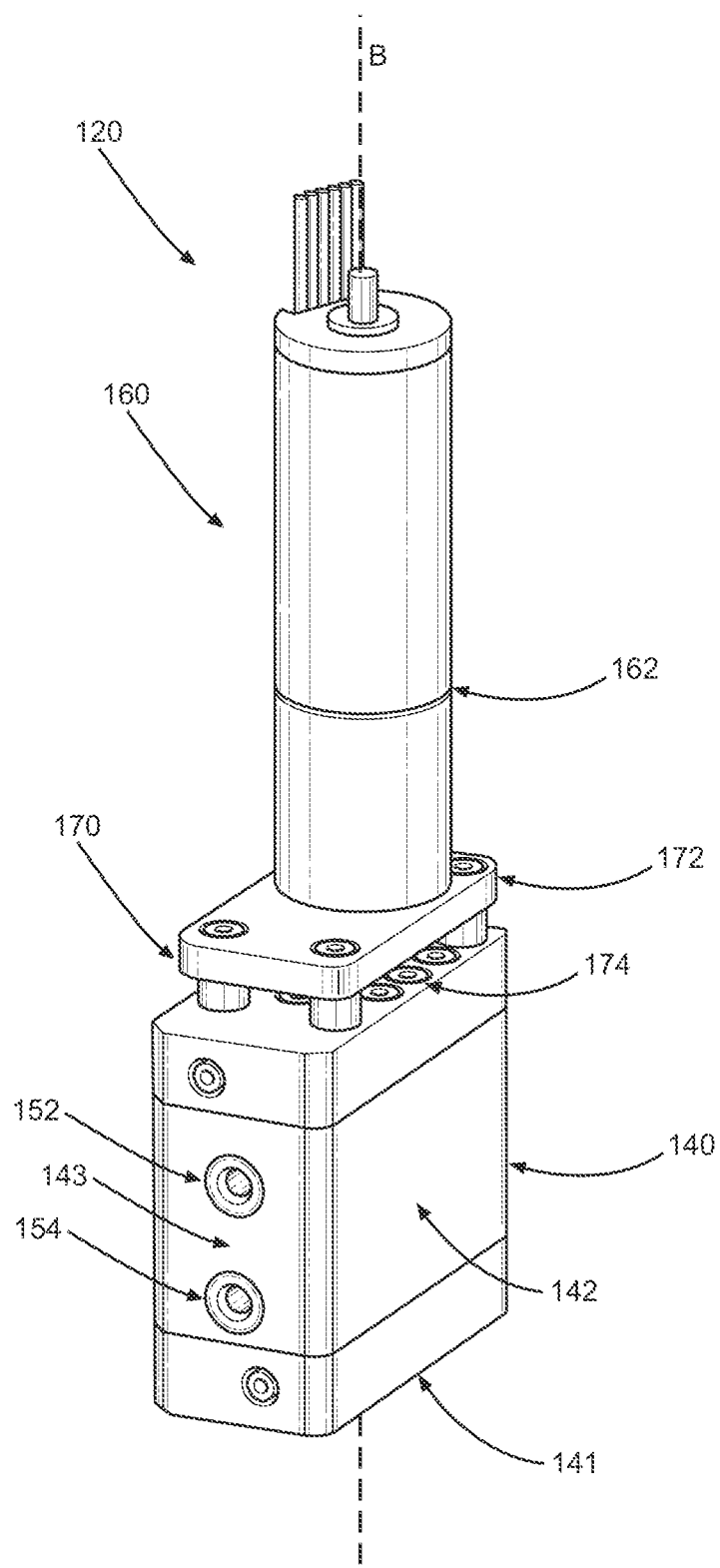
FIG. 12 is a perspective view of an alternative pump assembly that can be used in the applicator shown in FIG. 1.
Figure 13:
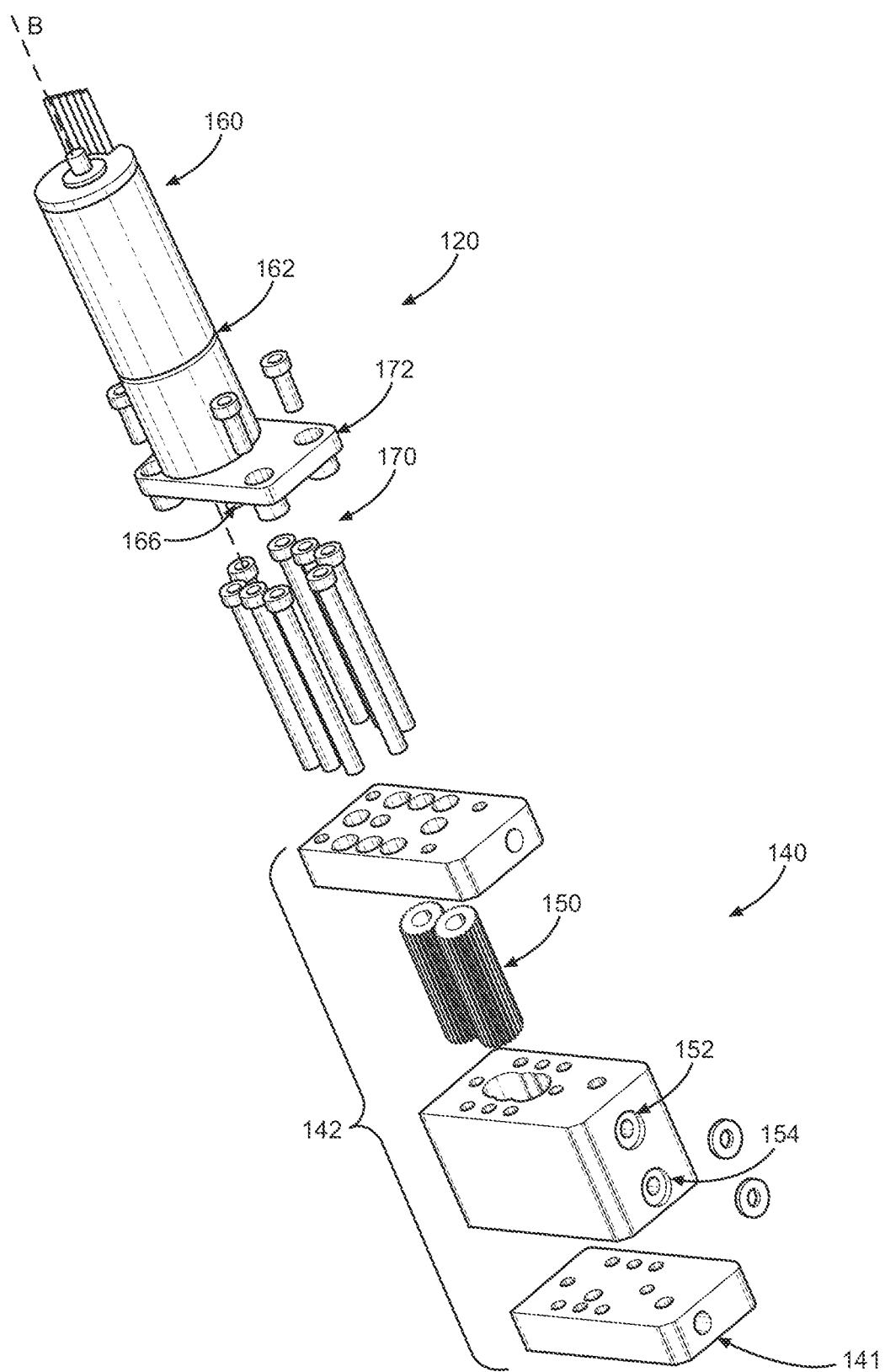
FIG. 13 is an exploded view of the pump assembly shown in FIG. 12.

FIGS. 12-13 illustrate another embodiment of the present invention. FIG. 12 shows a pump assembly 120 that is similar in most aspects to the pump assembly 20 shown in FIGS. 1-9 and described above. However, the pump assembly 120 has an inlet 152 and an outlet 154 that are oriented differently than the inlet 52 and outlet 54 of the pump assembly 20. The pump assembly 120 is configured to supply heated liquid to the manifold 12 at a given volumetric flow rate. Each pump assembly 120 includes a pump 140 and a dedicated drive motor unit 160 that powers the pump 140. The pump assembly 120 also includes a thermal isolation region 170 between the pump 140 and the drive motor unit 160. The thermal isolation region 170 is defined by a thermal isolation plate 172 and a gap 174 that extends from the thermal isolation plate 172 to the housing assembly 142. The thermal isolation region 170 minimizes thermal transfer of heat generated by the pump 140 to the drive motor unit 160, thereby minimizing the effect of temperature on the electronic components in the drive motor unit 160. The dedicated drive motor unit 160 and thermal isolation region 170 are the same as the drive motor unit 60 and the thermal isolation region 70 described above and illustrated in FIGS. 7-10.

Continuing with FIGS. 12-13, the drive motor unit 160 includes a motor 162, an output drive shaft 166, and connectors (not shown) that are coupled to a power source (not shown), as well as the control system (not shown). The drive shaft 166 has a drive axis B about which the drive shaft 166 rotates. When the pump assembly 120 is coupled to the manifold 12, the drive axis B may intersect and may be angularly offset with respect to the plane X that is perpendicular to the plane Y. In this configuration, the drive motor axis B does not intersect either the first side surface 34a or the second side surface 34b of the manifold 12. Additionally, the drive motor axis B does not intersect the bottom surface 30 of the manifold 12. Rather, the pump assembly 120 is positioned on the manifold 12 so that drive motor axis B of the drive motor unit 160 lies in a plane Y that is parallel to the first plane P1 and/or the second plane P2 of the first side surface 34a and the second side surface 34b, respectively.

The pump 140 defines a bottom surface 141 and a side surface 143, and includes a housing assembly 142 and one or more gear assemblies 150 contained within the housing assembly 142, an inlet 152 for receiving liquid from the manifold 12, and an outlet 154 for discharging liquid back into the manifold 12. In accordance with the illustrated embodiment, the inlet 152 and the outlet 154 of the pump 140 are disposed on the side surface 143 of the pump 140, such that the inlet 152 and outlet 154 are oriented in a direction that is perpendicular to the drive motor axis B of the drive motor unit 160.

Now referring to FIGS. 14-17B, one embodiment of a nozzle assembly that can be connected to the applicator 10 will be described. The first nozzle assembly 100 can include a first clamp 104, a second clamp 108, and a nozzle 110. In this embodiment, the nozzle 110 can comprise two separate plates—a first nozzle plate 112 and a second nozzle plate 116 separated by a shim 114. The shim 114 functions to separate the first and second nozzle plates 112 and 116 such that a gap is defined between the first and second nozzle plates 112 and 116. This gap between the first and second nozzle plates 112 and 116 defines a nozzle slot 120, through which adhesive can exit the applicator 10 and be applied to a substrate. As a result, the first nozzle assembly 100 can be a liquid adhesive contact nozzle assembly suitable for an adhesive coating application. The first and second clamps 104 and 108 can function to secure the nozzle 110 to the manifold 12. In particular, the first and second clamps 104 and 108 can function to directly engage the second nozzle plate 116 of the nozzle 110 to secure the nozzle 110 to the manifold 12.

The first clamp 104 can include a plurality of bores configured to receive fasteners that secure the first clamp 104 to the manifold 12 and the nozzle 110. For example, the first clamp 104 includes a plurality of first clamp manifold bores 124 that extend through the first clamp 104 and are each configured to receive a fastener 125. In the depicted embodiment, the first clamp 104 defines six first clamp manifold bores 124a-124f, which can be designated as first, second, third, fourth, fifth, and sixth first clamp manifold bores 124a, 124b, 124c, 124d, 124e, and 124f. However, the first clamp 104 can define more or less than six first clamp manifold bores 124 as desired. For example, the first clamp 104 can define one, two, or more than six first clamp manifold bores 124. As noted, each of the first clamp manifold bores 124a-124f can be configured to receive a fastener 125. The faster 125 can be a screw, bolt, or any other type of fastener that is capable of releasably coupling the first clamp 104 to the manifold 12. However, it is contemplated that the fastener 125 may irremovably couple the first clamp 104 to the manifold 12.

The first clamp 104 can also include a plurality of first clamp nozzle bores 128 that extend through the first clamp 104 and are each configured to receive a fastener 129. In the depicted embodiment, the first clamp 104 defines three first clamp nozzle bores 128, which can be designated as first, second, and third first clamp nozzle bores 128a, 128b, and 128c. However, the first clamp 104 can define more or less than three first clamp nozzle bores 128 as desired. For example, the first clamp 104, can define one, two, or more than three first clamp nozzle bores 128. As noted, each of the first clamp nozzle bores 128a-128c can be configured to receive a fastener 129. Like the fastener 125, the fastener 129 can be a screw, bolt, or any other type of fastener that is capable of releasably coupling the first clamp 104 to the nozzle 110, particularly the second nozzle plate 116. However, it is contemplated that the fastener 129 may irremovably couple the first clamp 104 to the nozzle 110.

With reference to FIGS. 17A-17B, the first clamp 104 can include a body that defines a plurality of surfaces. In the embodiment shown, the first clamp 104 defines a first surface 104a, a second surface 104b that extends from the first surface 104a, and a third surface 104c that extends from the second surface 104b. The first surface 104a can extend substantially normal to the vertical direction 6 and can be configured to contact a portion of the manifold 12 when the first nozzle assembly 100 is attached to the manifold 12. The second surface 104b may be angularly offset with respect to the first surface 104a, and may define a first opening for each of the first clamp manifold bores 124a-124f. The third surface 104c may be angularly offset with respect to the second surface 104b, and can define an opening for each of the first clamp nozzle bores 128a-128c.

The first clamp 104 can further define a fourth surface 104d that extends from the third surface 104c, a fifth surface 104e that extends from the fourth surface 104d, a sixth surface 104f that extends from the fifth surface 104e, and a seventh surface 104g that extends from the sixth surface 104f to the first surface 104a. The fourth surface 104d can be substantially perpendicular to the third and fifth surfaces 104c and 104e, and can partially contact the nozzle 110, particularly the first nozzle plate 112, when the first nozzle assembly 100 is fully assembled. Likewise, the fifth surface 104e of the first clamp 104 can also contact the nozzle assembly 100, particularly the second nozzle plate 116, when the first nozzle assembly 100 is fully assembled. The fifth surface 104e can define a second opening for each of the first clamp nozzle bores 128a-128c, such that the first clamp nozzle bores 128a-128c extend through the body of the first clamp 104 from the third surface 104c to the fifth surface 104e. The sixth surface 104f can be angularly offset with respect to the fifth surface 104e. In the depicted embodiment, the sixth surface 104f is offset with respect to the fifth surface 104e by an angle that is less than 90 degrees. The sixth surface 104f can also be configured to engage a portion of the nozzle 110, particularly the second nozzle plate 116, when the first nozzle assembly 100 is fully assembled. The seventh surface 104g can be substantially perpendicular to the first surface 104a, and can define a second opening for each of the first clamp manifold bores 124a-124f, such that the first clamp manifold bores 124a-124f extend through the body of the first clamp 104 from the second surface 104b to the seventh surface 104g. When the first nozzle assembly 100 is in the assembled configuration, the seventh surface 104g of the first clamp 104 can be configured to engage a portion of the manifold 12.

The first clamp 104 can also define first and second side surfaces, which can be designated as eighth surface 104h and ninth surface 104i. The eighth and ninth surfaces 104h and 104i of the first clamp 104 can each extend between each of the first through seventh surface 104a-104g, such that each of the surfaces 104a-104g extends from the eighth surface 104h to the ninth surface 104i. As a result, the eighth surface 104h may be substantially opposite the ninth surface 104i.

Like the first clamp 104, the second clamp 108 can include a plurality of bores configured to receive fasteners that secure the second clamp 108 to the manifold 12. For example, the second clamp 108 includes a plurality of second clamp bores 136 that extend through the second clamp 108 and are each configured to receive a fastener 137. As shown, the second clamp 108 defines six second clamp bores 136, which can be designated as first, second, third, fourth, fifth, and sixth second clamp bores 136a, 136b, 136c, 136d, 136e, and 136f. However, the second clamp 108 can define more or less than six second clamp bores 136 as desired. For example, the second clamp 108 can define one, two, or more than six second clamp manifold bores 136. As noted, each of the second clamp bores 136a-136f can be configured to receive a fastener 137. Like the fasteners 125 and 129, the fastener 137 can be a screw, bolt, or any other type of fastener that is capable of releasably coupling the second clamp 108 to the manifold 12. However, it is contemplated that the fastener 137 may irremovably couple the second clamp 108 to the manifold 12.

Continuing with FIGS. 17A-17B, the second clamp 108 can also define a body that defines a plurality of surfaces. In the embodiment shown, the second clamp 108 defines a first surface 108a, a second surface 108b that extends from the first surface 108a, a third surface 108c that extends from the second surface 108b, and a fourth surface 108d that extends from the third surface 108c to the first surface 108a. The first surface 108a can extend substantially normal to the vertical direction 6, and can be configured to contact a portion of the manifold 12 when the first nozzle assembly 100 is attached to the manifold 12. The first surface 108a can also define a first opening for each of the second clamp bores 136a-136f. The second surface 108b may be angularly offset with respect to the first surface 108a, and may be configured to engage a portion of the nozzle 110, particularly the second nozzle plate 116. The third surface 108c can be substantially opposite the first surface 108a, and can be angularly offset from the second surface 108b. The third surface 108c can also define a second opening for each of the second clamp bores 136a-136f, such that the second clamp bores 136a-

136*f* extend through the body of the second clamp 108 from the third surface 108*c* to the first surface 108*a*. The fourth surface 108*d* can be substantially perpendicular to the third and first surfaces 108*c* and 108*a*, and can be configured to engage a portion of the manifold 12 when the first nozzle assembly 100 is attached to the manifold 12. The second clamp 108 can also define first and second side surfaces, which can be designated as fifth and sixth surfaces 108*e* and 108*f*. The fifth and sixth surfaces 108*e* and 108*f* of the second clamp 108 can extend between each of the first through fourth surfaces 108*a*-108*d*, such that each of the surfaces 104*a*-104*d* extends from the fifth surface 104*e* to the sixth surface 104*f*. As a result, the fifth surface 108*e* can be substantially opposite the sixth surface 108*f*.

As noted above, the nozzle 110 can include a first nozzle plate 112, a shim 114, and a second nozzle plate 116. The nozzle 110 can be configured such that the first and second nozzle plates 112 and 116 and the shim 114 are releasably coupled to each other. For example, the first nozzle plate 112 can define a plurality of first nozzle bores 132 that are configured to receive fasteners 133 that secure the first nozzle plate 112 to the shim 114 and the second nozzle plate 116. As shown, the first nozzle plate 112 can include four first nozzle bores 132, which can be designated as first, second, third, and fourth first nozzle bores 132*a*, 132*b*, 132*c*, and 132*d*. However, the first nozzle plate 112 can define more or less than four first nozzle bores 132 as desired. For example, the first nozzle plate 112 can define one, two, or more than four first nozzle bores 132. As described, each of the first nozzle bores 132*a*-*d* can be configured to receive a fastener 133. Fasteners 133 can be screws, bolts, or any other type of fastener that is capable of releasably coupling the first nozzle plate 112 to the second nozzle plate 116. However, it is contemplated that the fasteners 133 may irremovably coupled the first nozzle plate 112 to the second nozzle plate 116.

The first nozzle plate 112 of the nozzle 110 can also include a body that defines a plurality of surfaces. In the embodiment shown, first nozzle plate 112 defines a first surface 112*a*, a second surface 112*b* that extends from the first surface 112*a*, a third surface 112*c* that extends from the second surface 112*b*, and a fourth surface 112*d* that extends from the third surface 112*c* to the first surface 112*a*. The first surface 112*a* can extend substantially normal to the vertical direction 6, and can be configured to contact a portion of the second nozzle plate 116 when the nozzle 110 is fully assembled. The second surface 112*b* can be angularly offset from the first surface 112*a*, and can define a first opening for each of the first nozzle bores 132*a*-132*d*. The third surface 112*c* can be opposite the first surface 112*a* and be angularly offset from the second surface 112*b*, such as by an obtuse angle. The fourth surface 112*d* can be opposite the second surface 112*b*, and can define a second opening for each of the first nozzle bores 132*a*-132*d*, such that the first nozzle bores 132*a*-132*d* extend through the body of the first nozzle plate 112 from the second surface 112*b* to the fourth surface 112*d*. Additionally, the first nozzle plate 112 can define first and second side surfaces, which can be designated as fifth surface 112*e* and sixth surface 112*f*. The fifth and sixth surfaces 112*e* and 112*f* of the first nozzle plate 112 can each extend between each of the first through fourth surfaces 104*a*-104*d*, such that each of the four surfaces 104*a*-104*d* extends from the fifth surface 104*e* to the sixth surface 104*f*. As a result, the fifth surface 112*e* can be substantially opposite the sixth surface 112*f*.

Continuing with FIGS. 17A-17B, the second nozzle plate 116 can define a plurality of second nozzle bores 190 that are configured to each receive a portion of a respective fastener 133 that secures the first nozzle plate 112 to the shim 114 and the second nozzle plate 116. As shown, the second nozzle plate 116 defines four second nozzle bores 190, which can be designated as first, second, third, and fourth second nozzle bores 190*a*, 190*b*, and 190*c* (one of the nozzle bores is not shown). However, the second nozzle plate 116 can define more or less than four second nozzle bores 140 as desired. For example, the second nozzle plate 116 can define one, two, or more than four second nozzle bores 190. The number of second nozzle bores 190 defined by the second nozzle plate 116 may generally correlate to the number of first nozzle bores 132 defined by the first nozzle plate 112.

Additionally, the second nozzle plate 116 of the nozzle 110 can define a body that includes a plurality of surfaces. In the embodiment shown, the second nozzle plate 116 defines a first surface 116*a*, a second surface 116*b* that extends from the first surface 116*a*, a third surface 116*c* that extends from the second surface 116*b*, a fourth surface 116*d* that extends from the third surface 116*c*, a fifth surface 116*e* that extends from the fourth surface 116*d*, a sixth surface 116*f* that extends from the fifth surface 116*e*, a seventh surface 116*g* that extends from the sixth surface 116*f*, an eighth surface 116*h* that extends from the seventh surface 116*g* to the first surface 116*a*. The first surface 116*a* can extend substantially normal to the vertical direction 6, and can be configured to contact a portion of the manifold 12 when the first nozzle assembly 100 is attached to the manifold 12. The first surface 116*a* can also be configured to engage a portion of the first clamp 104 when the first nozzle assembly 100 is attached to the manifold 12. The second surface 116*b* can be angularly offset with respect to the first surface 116*a*, and may also be configured to engage the first clamp 104 when the first nozzle assembly 100 is attached to the manifold 12. The third surface 116*c* can be angularly offset with respect to the second surface 116*b*, and can be substantially opposite the first surface 116*a*. The third surface 116*c* can also be configured to engage the first nozzle plate 112 when the nozzle 110 is fully assembled.

Continuing with FIGS. 17A-17B, the fourth surface 116*d* of the second nozzle plate 116 can be angularly offset from the third surface 116*c*, and can also be configured to engage the shim 114 when the nozzle 110 is fully assembled. Additionally, the fourth surface 116*d* can define a first opening for the second nozzle bores 190. The fifth surface 116*e* can be substantially opposite the first surface 116*a*, and may be curved. The sixth surface 116*f* can be substantially opposite the fourth surface 116*d*, and can define a second opening for the second nozzle bores 190, such that the second nozzle bores 190 extend through the second nozzle plate 116 from the fourth surface 116*d* to the sixth surface 116*f*. The seventh surface 116*g* can be angularly offset from the sixth and eighth surface 116*f* and 116*h*, and can be substantially opposite the first surface 116*a*. The eighth surface 116*h* can be angularly offset from the first surface 116*a*, and can be configured to engage the second clamp 108 when the first nozzle assembly 100 is attached to the manifold 12. The eighth surface 116*h* can also be opposite the second surface 116*b* along the longitudinal direction 2 and angularly offset from the second surface 116*b*.

The second nozzle plate 116 can further define first and second side surfaces, which can be designated as a ninth surface 116*i* and a tenth surface 116*j*. The ninth and tenth surfaces 116*i* and 116*j* of the second nozzle plate 116 can extend between each of the first through eighth surfaces 116*a*-116*h*, such that each of the eight surfaces 116*a*-116*h* extends from the ninth surface 116*i* to the tenth surface 116*j*.

As a result, the ninth surface 116*i* can be substantially opposite the sixth surface 116*f*.

Continuing with FIGS. 17A-17B, the shim 114 can be disposed between the first nozzle plate 112 and the second nozzle plate 116 when the nozzle 110 is in the assembled configuration. The shim 114 can be substantially planar, and can have a first surface 114*a* and a second surface 114*b* opposite the first surface 114*a*. When the nozzle 110 is assembled, the first surface 114*a* of the shim 114 contacts the fourth surface 112*d* of the first nozzle plate 112, and the second surface 114*b* of the shim 114 contacts the fourth surface 116*d* of the second nozzle plate 116. As a result, the shim 114 creates a gap between the first and second nozzle plates 112 and 116. The shim 114 further defines a plurality of notches 117 that, along with the gap created by the shim 114 between the first and second nozzle plates 112 and 116, define the nozzle slot 120. Though depicted as defining four notches 117, the shim 114 can alternatively define any number of notches 117 as desired, depending on the particular nozzle slot 120 that is intended. The shim 114 further defines shim bores 115 that extend from the first surface 114*a* to the second surface 114*b*, and are configured to receive fasteners 133, which allows the shim 114 to be secured to the first and second nozzle plates 112 and 116.

Figure 14:
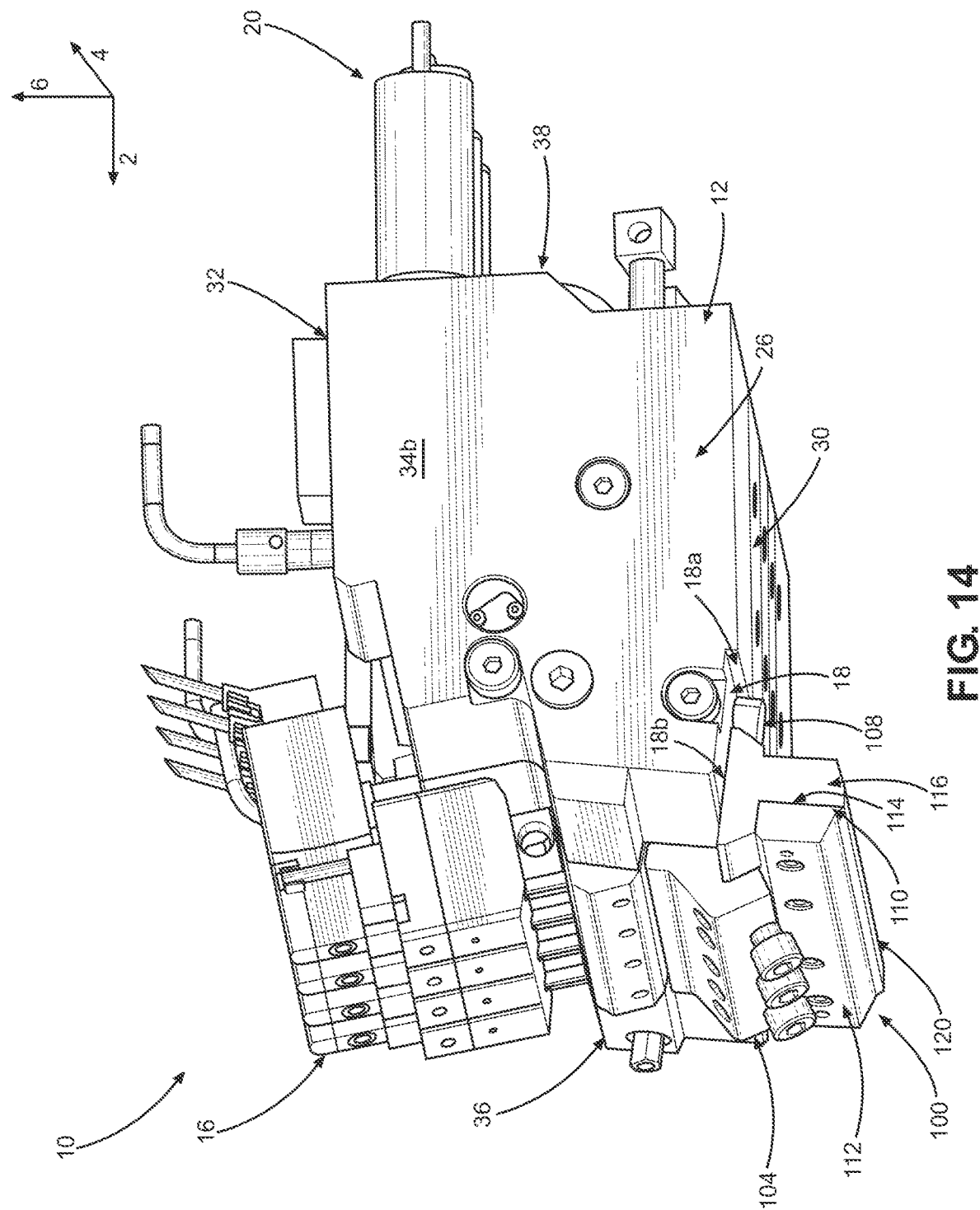
FIG. 14 is a side perspective view of the applicator shown in FIG. 1, with a first nozzle assembly attached to the manifold.
Figure 15:
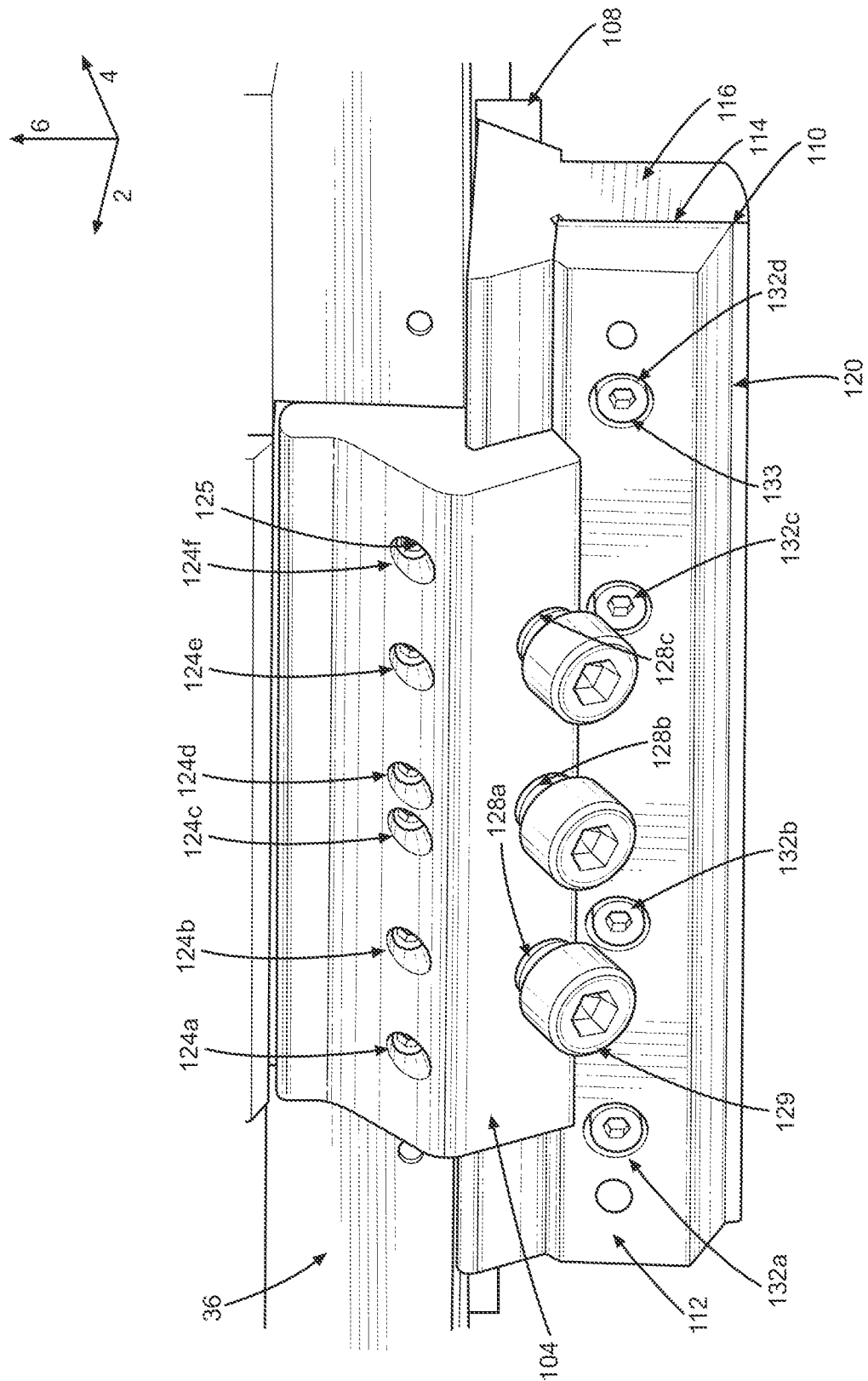
FIG. 15 is a front perspective view of a portion of the applicator shown in FIG. 14.
Figure 16:
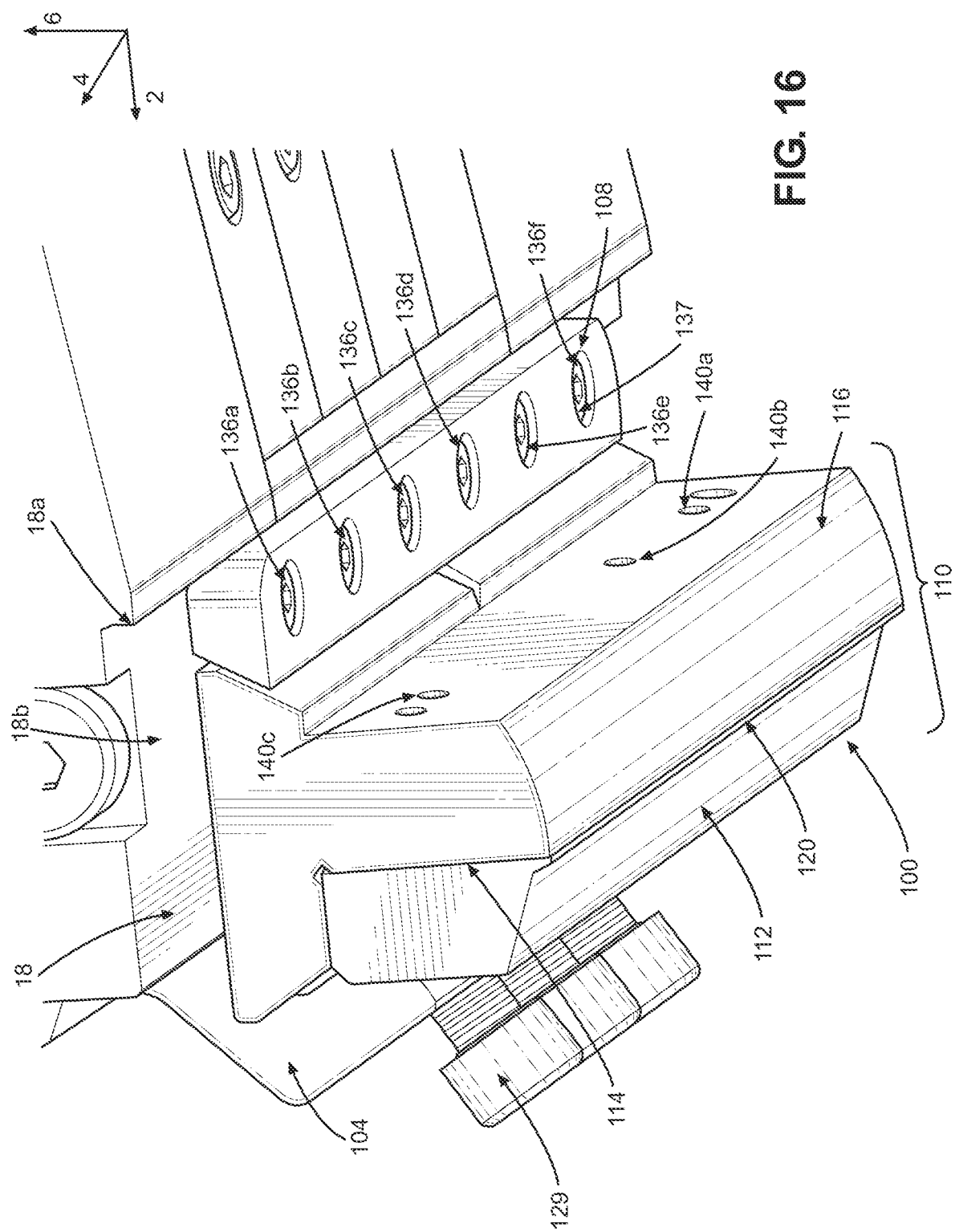
FIG. 16 is a bottom perspective view of a portion of the applicator shown in FIG. 14.

The interaction of the various parts of the first nozzle assembly 100 when the first nozzle assembly 100 is secured to the manifold 12 will now be described. As shown in FIGS. 13-15, when the first nozzle assembly 100 is attached to the manifold 12, the nozzle 110 is assembled by securing the first nozzle plate 112 to the shim 114 and the second nozzle plate 116. This is accomplished by inserting fasteners 133 through the first nozzle bores 132*a*-132*d* of the first nozzle plate 112, through the shim bores 115 of the shim 114, and through the second nozzle bores 140*a*-140*d* of the second nozzle plate 116. When assembled, the first surface 112*a* of the first nozzle plate 112 contacts the third surface 116*c* of the second nozzle plate 116, and the fourth surface 112*d* of the first nozzle plate 112 contacts the first surface 114*a* of the shim 114. Collectively, the first and second nozzle plate 112 and 116 and the shim 114, particularly the notches 117 of the shim 114 along with the gap formed by the shim 114 between fourth surface 112*d* of the first nozzle plate 112 and the fourth surface 116*d* of the second nozzle plate 116 can define the nozzle slot 120, which defines a path for adhesive to flow out of the nozzle 110.

Once assembled, the nozzle 110, along with the first and second clamps 104 and 108, can be attached to the manifold 12. To secure the nozzle 110 to the manifold 12, the first clamp 104 engages the body 13 of the manifold 12 and a first side of the nozzle 110, while the second clamp 108 engages the body 13 of the manifold 12 and the second side of the nozzle 110. In the depicted embodiment, both the first and second clamps 104 and 108 engage the second nozzle plate 116, though other configurations are contemplated. To secure the nozzle 110 to the manifold 12, the sixth surface 104*f* of the first clamp 104 engages the first surface 116*a* of the second nozzle plate 116, and the fifth surface 104*e* of the first clamp 104 engages the second surface 116*b* of the second nozzle plate 116. Additionally, the fourth surface 104*d* of the first clamp 104 can contact the second surface 112*b* of the first nozzle plate 112. Together, the fifth and sixth surfaces 104*e* and 104*f* of the first clamp 104 can impart an upward and rearward force on the nozzle 110, particularly the second nozzle plate 116, to keep the nozzle 110 engaged with the manifold 12. To maintain this engagement, the fasteners 125 are inserted through the first clamp manifold bores 124*a*-124*c* of the first clamp 104 and bores 37 of the manifold, and thus are secured to the manifold 12, such that the first contact surface 39 of the manifold 12 engages the first surface 104*a* of the first clamp 104. Also, the fasteners 129 are inserted through the first clamp nozzle bores 128*a*-128*c* and secured to the nozzle 110, particularly the second nozzle plate 116. In this configuration, second contact surface 18*a* of the manifold 12 engages the first surface 116*a* of the second nozzle plate 116.

On the other side of the nozzle 110, the second clamp 108 engages the second nozzle plate 116 to impart an upward and forward force onto the nozzle 110. As a result, the nozzle 110 is effectively wedged between the first and second clamps 104 and 108. This wedging helps prevent leaks between the nozzle 110 and the manifold 12, as well as ensures adequate heat transfer from the manifold 12 to the nozzle 110. When the nozzle 110 and the second clamp 108 are connected to the manifold 12, the second surface 108*b* of the second clamp 108 engages the eighth surface 116*h* of the second nozzle plate 116. To maintain this engagement, the fasteners 137 are inserted through the second clamp bores 136*a*-136*d* of the second clamp 108 and through the bores 31 of the manifold 12, such that the second contact surface 18*a* of the manifold 12 engages the first surface 108*a* of the second clamp 108. Additionally, the fourth surface 108*d* of the second clamp 108 can engage the third contact surface 18*b* of the manifold 12. As a result, when the first nozzle assembly 100 is fully assembled and attached to the manifold 12, at least a portion of the first nozzle assembly 100 is received in the recess 18 of the manifold 12.

Now referring to FIGS. 18-21D, another embodiment of a nozzle assembly that can be connected to the applicator 10 will be described. The second nozzle assembly 200 can include first clamps 204, a second clamp 208, nozzles 212, and plates 216. Unlike the first nozzle assembly 100, each nozzle 212 of the second nozzle assembly 200 can comprise a single, monolithic structure. As such, each nozzle 212 defines a nozzle slot 220, which is configured to emit adhesive from the applicator 10. However, the second nozzle assembly 200 can define a plurality of nozzles 212. For example, the depicted embodiment includes four nozzles, which can be designated as a first nozzle 212*a*, second nozzle 212*b*, third nozzle 212*c*, and fourth nozzle 212*d*. Likewise, the second nozzle assembly 200 can include multiple first clamps 204 and multiple plates 216. For example, the second nozzle assembly 200 can include four first clamps 204 and four plates 216, which can be designated as a first first clamp 204*a*, second first clamp 204*b*, third first clamp 204*c*, fourth first clamp 204*d*, first plate 216*a*, second plate 216*b*, third plate 216*c*, and fourth plate 216*d*. Each of the first clamps 204*a*-204*d* and plates 216*a*-216*d* can correspond to a respective nozzle 212*a*-212*d*. Though four sets of first clamps 204*a*-204*d*, nozzles 212*a*-212*d*, and plates 216*a*-216*d* are shown and described, the second nozzle assembly 200 can be configured to include more or less of these features. Additionally, though depicted as a unitary structure, the second clamp 208 can be alternatively configured as four separate second clamps (not shown), such that each of the four second clamps corresponds to a respective one of the nozzles 212*a*-212*d*. The second nozzle assembly 200 can be a liquid adhesive spray nozzle assembly suitable for an adhesive coating application. The first clamps 204*a*-204*d*, second clamp 208, and the plates 216*a*-216*d* can function to secure the nozzles 212*a*-212*d* to the manifold 12. In particular, the first clamps 204*a*-204*d* and the second clamp 208 can function to directly engage the nozzles 212*a*-212*d* to secure the nozzles 212*a*-212*d* to the manifold 12.

Referring to FIGS. 18-21A, each of the first clamps 204a-204d can define a bore configured to receive a fastener that secures the first clamp 204 to the manifold 12 and the nozzles 212a-212d. For example, each of the first clamps 204a-204d can define a bore 224 that extends through the first clamps 204a-204d and is configured to receive a fastener 229. Though shown as including one bore 224, each of the first clamps 204a-204d can define more than one bore 224 as desired. For example, each of the first clamps 204a-204d can include two, three, or more than three bores. The fasteners 229 that can be received by the bores 224 of the first clamps 204a-204d can be screws, bolts, or any other type of fastener that is capable or releasably coupling the first clamps 204a-204d to the manifold 12. However, it is contemplated that the fasteners 229 may irremovably couple the first clamps 204a-204d to the manifold 12.

Figure 21A:
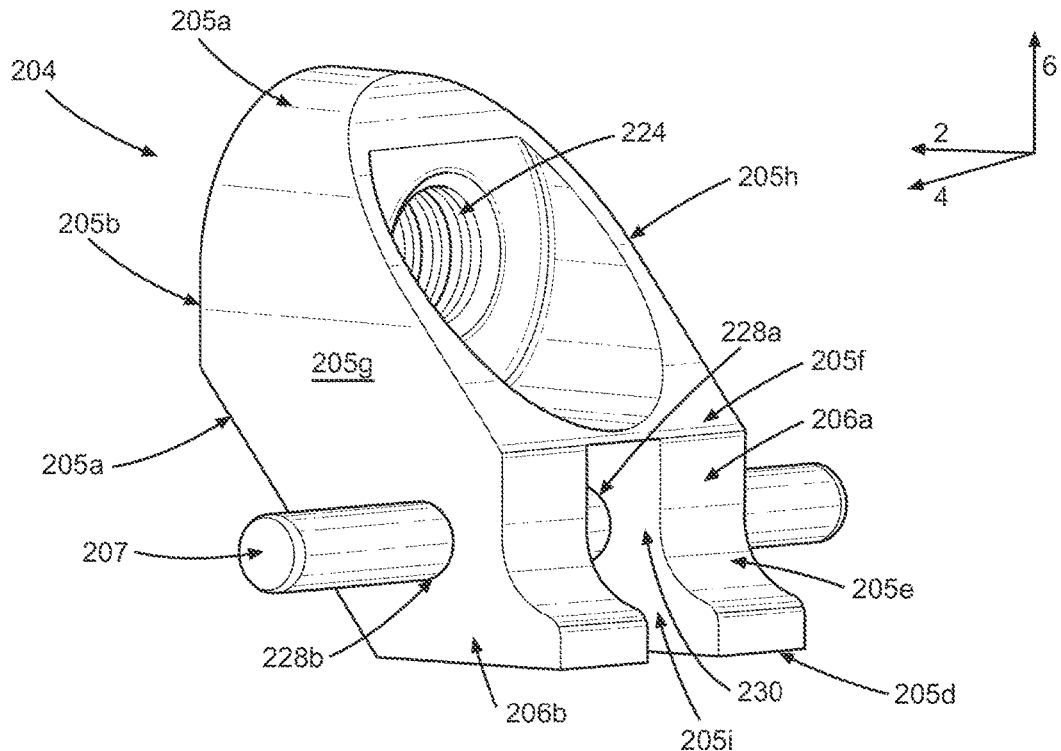
FIG. 21A is a perspective view of a first clamp shown in FIG. 18.
Figure 21B:
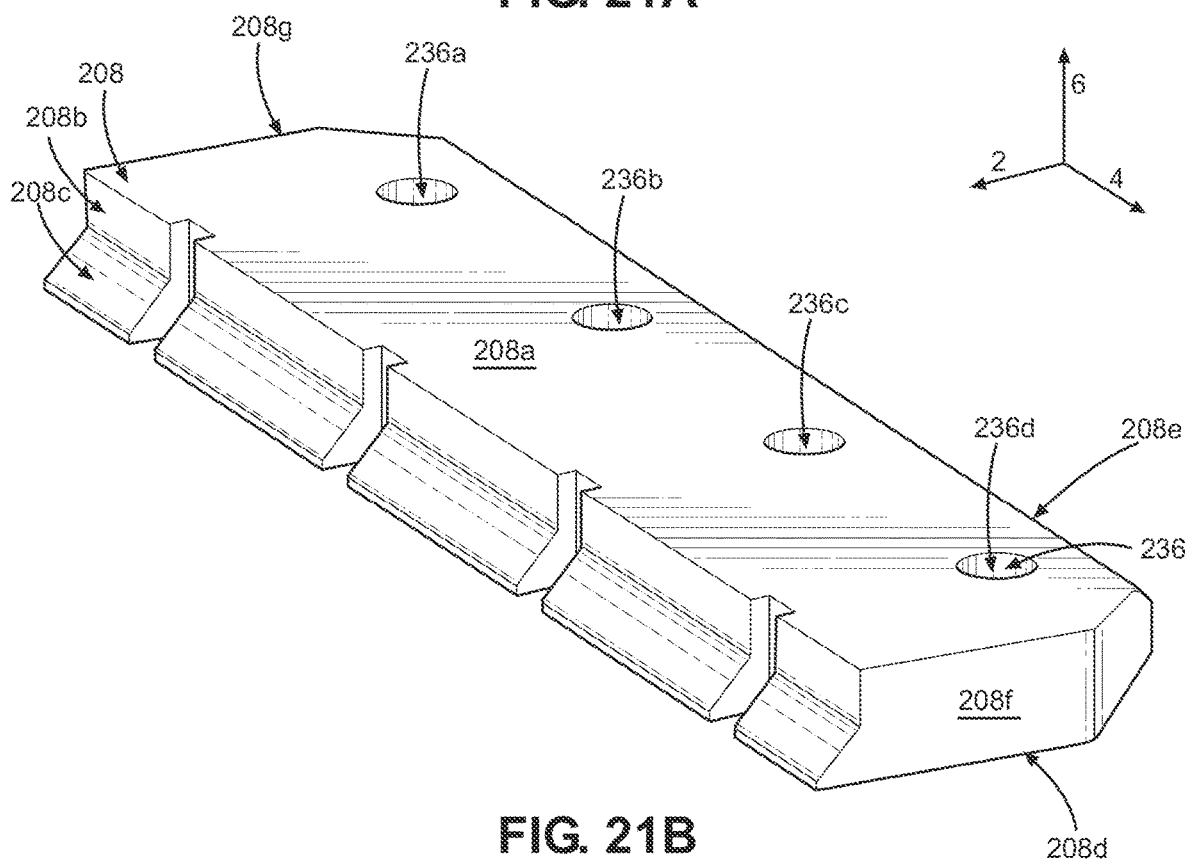
FIG. 21B is a perspective view of a second clamp shown in FIG. 18.
Figure 21C:
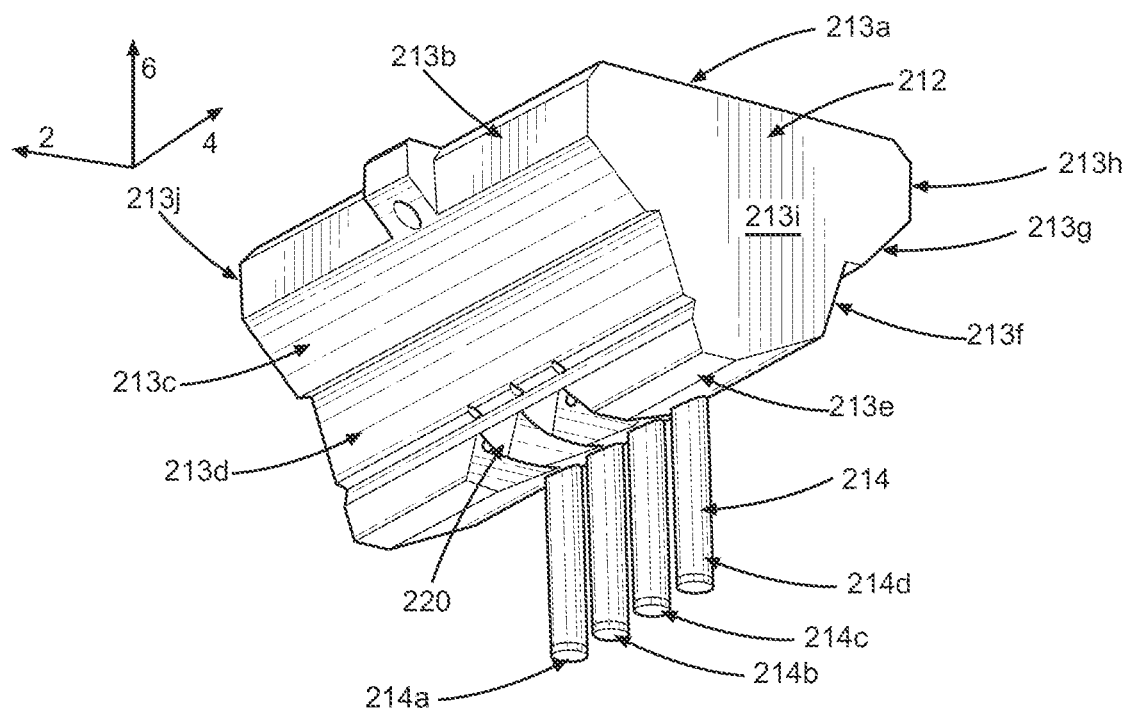
FIG. 21C is a perspective view of a nozzle shown in FIG. 18.
Figure 21D:
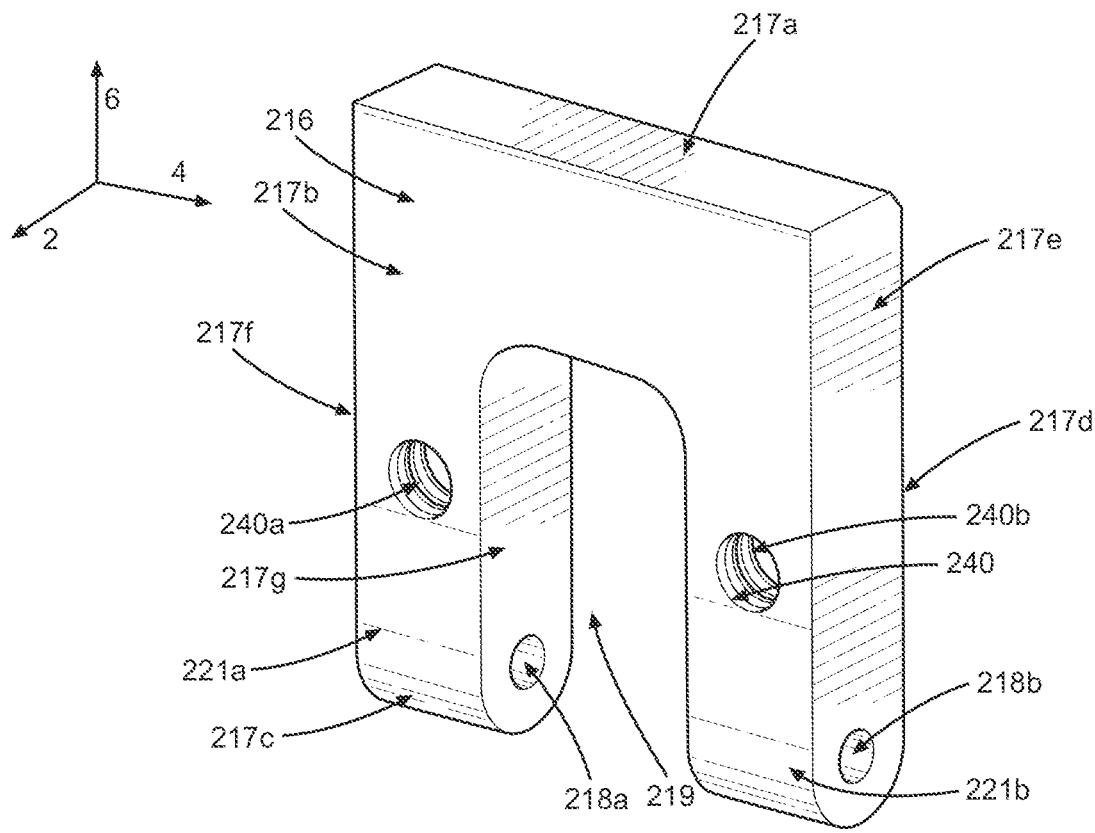
FIG. 21D is a perspective view of a plate shown in FIG. 18.

With reference to FIG. 21A, each of the first clamps 204a-204d can include a body that defines a plurality of surfaces. Though only one of the first clamps 204 is described, it can be equally representative of each of the first clamps 204a-204d. The first clamp 204 can define a first surface 205a, a second surface 205b that extends from the first surface 205a, a third surface 205c that extends from the second surface 205b, a fourth surface 205d that extends from the third surface 205c, a fifth surface 205e that extends from the fourth surface 205d, and a sixth surface 205f that extends from the fifth surface 205e to the first surface 205a. The first surface 205a can be substantially curved, and the second surface 205b can be angularly offset from the first surface 205a. The second surface 205b can also define a first opening for the bore 224 that extends through the body of the first clamp 204. The third surface 205c can be angularly offset from the second surface 205b, and can define a forward opening for a channel 230 that extends through the first clamp 204. The fourth surface 205d can be substantially opposite the first surface 205a, and define a bottom opening for the channel 230. The fifth surface 205e can be curved, and can define a rearward opening for the channel 230, such that the channel 230 extends through the first clamp 204 from the third surface 205c to the fifth surface 205e. The sixth surface 205f can be angularly offset from the fifth and first surfaces 205e and 205a, and can define a second opening for the bore 224, such that the bore 224 extends through the first clamp 204 from the second surface 205b to the sixth surface 205f.

The first clamp 204 can also define first and second side surfaces, which can be designated as seventh and eighth surfaces 205g and 205h. The seventh and eighth surfaces 205g and 205h can each extend between the first through sixth surfaces 205a-205h, such that each of the first through sixth surface 205a-205h extends from the seventh surface 205g to the eighth surface 205h. The first clamp 204 can also define a ninth surface 205i that extends upward from the fourth surface 205d of the first clamp 204 laterally between the seventh and eighth surfaces 205g and 205h. The ninth surface can substantially define the channel 230 that extends through the first clamp 204. The channel 230 may extend through the lower end of the first clamp 204 along the longitudinal direction 2, such that the first clamp 204 defines two arms 206a and 206b. The first and second arms 206a and 206b can be spaced apart along the lateral direction 4. The first arm 206a can define a first passage 228a that extends from the seventh surface 205g to the ninth surface 205i, and the second arm 206b can define a second passage 228b that extends from the eighth surface 205h to the ninth surface 205i. The first and second passages 228a and 228b can be aligned along the longitudinal direction 2, and can each be configured to receive a rod 207 that extends through the first clamp 204. Though a single unitary rod 207 is depicted, the rod 207 can comprise more than one rod segment. The rod 207 is configured to secure the first clamp 204 to the plate 216, as will be discussed further below.

Continuing with FIGS. 18-20 and 21B, the second clamp 208 can include a body that defines a plurality of bores configured to receive fasteners that secure the second clamp 108 to the manifold 12. For example, the second clamp 208 includes a plurality of second clamp bores 236 that extend through the second clamp 208 and are each configured to receive a fastener 237. As shown, the second clamp 208 defines four second clamp bores 236, which can be designated as first, second, third, and fourth second clamp bores 236a, 236b, 236c, and 236d. However the second clamp bores 236 can define more or less than four second clamp manifold bores 236 as desired. For example, the second clamp 208 can define one, two, or more than four second clamp bores 236. As noted, each of the second clamp bores 236a-236d can be configured to receive a fastener 237. The fasteners 237 can be screws, bolts, or any other type of fastener that is capable of releasably coupling the second clamp 208 to the manifold 12. However, it is contemplated that the fasteners 237 may irremovably couple the second clamp 208 to the manifold 12.

The second clamp 208 can also define a body that defines a plurality of surfaces. In the embodiment shown, the second clamp 208 defines a first surface 208a, a second surface 208b that extends from the first surface 208a, a third surface 208c that extends from the second surface 208b, a fourth surface 208d that extends from the third surface 208c, and a fifth surface 208e that extends from the fourth surface 208d to the first surface 208a. The first surface 208a can extend substantially normal to the vertical direction 6, and can be configured to contact a portion of the manifold 12 when the second nozzle assembly 200 is attached to the manifold 12. The first surface 208a can also define a first opening for each of the second clamp bores 236a-236d. The second surface 208b may be angularly offset with respect to the first surface 208a, and may be configured to engage a portion of the nozzles 212a-212d. The third surface 208c can be angularly offset from the second surface 208b. In the depicted embodiment, the third surface 208c is angularly offset from the second surface 208b by an obtuse angle. The third surface 208c can also engage a portion of the nozzles 212a-212d. The fourth surface 208d can be substantially opposite the first surface 208a, and can define a second opening for each of the second clamp bores 236a-236d, such that the second clamp bores 236a-236d extend through the body of the second clamp 208 from the first surface 208a to the fourth surface 208d. The fifth surface 208e can be substantially perpendicular to the first and fourth surfaces 208a and 208d, and can be opposite the second and third surfaces 208b and 208c along the longitudinal direction 2. The fifth surface 208e can also be configured to engage a portion of the manifold 12 when the second nozzle assembly 200 is attached to the manifold 12.

Now referring to FIGS. 18-20 and 21C, the nozzles 212a-212d define the portion of the second nozzle assembly 200 through which adhesive exits the applicator 10. Though one nozzle 212 is described, it can be equally representative of each of the nozzles 212a-212d. The nozzle 212 can define a body that defines a first surface 213a, a second surface 213b that extends from the first surface 213a, a third surface 213c that extends from the second surface 213b, a fourth surface 213d that extends from the third surface 213c, and a fifth surface 213e that extends from the fourth surface 213d. The first surface 213a can extend substantially normal to the vertical direction 6, and be configured to contact a portion of the manifold 12 when the second nozzle assembly 200 is attached to the manifold 12. The second surface 213b can be substantially perpendicular to the first surface 213a, and the third surface 213c can be angularly offset from the second surface 213b. The second and third surfaces 213b and 213c can be configured to engage a portion of the first clamp 204 when the second nozzle assembly 200 is attached to the manifold 12. The fourth surface 213d can be angularly offset from the third surface 213c, and the fifth surface 213e can be substantially opposite the first surface 213a along the vertical direction 6. Further, the fifth surface 213e can extend substantially normal to the vertical direction 6.

The body of the nozzle 212 can also include a sixth surface 213f that extends from the fifth surface 213e, a seventh surface 213g that extends from the sixth surface 213f, and an eighth surface 213h that extends from the seventh surface 213g to the first surface 213a. The sixth surface 213f can be angularly offset from the fifth surface 213e, and the seventh and eighth surfaces 213g and 213h can be angularly offset from each other. The seventh surface 213g can be opposite the third surface 213c along the longitudinal direction 2, and the eighth surface 213h can be opposite the second surface 213b along the longitudinal direction 2. Additionally, the seventh and eighth surfaces 213g and 213h can be configured to engage a portion of the second clamp 208 when the second nozzle assembly 200 is attached to the manifold 12. The nozzle 212 can also define first and second side surfaces, which can be designated as ninth and tenth surfaces 213i and 213j. The ninth and tenth surfaces 213i and 213j of the nozzle 212 can each extend between each of the first through eighth surfaces 213a-213h, such that each of the eight surfaces 213a-213h extends from the ninth surface 213i to the tenth surface 213j. As a result, the ninth surface 213i can be opposite the tenth surface 213j. Additionally, the fourth, fifth, and sixth surfaces 213d-213f can collectively define the nozzle slots 220 through which adhesive exits the nozzle. The nozzle 212 can include a plurality of tubes 214 that provide a pathway for pressurized air to exit the nozzle 212 and interact with the adhesive flowing through the nozzle slots 220. As such, the nozzle 212 can be a liquid adhesive spray nozzle. In the depicted embodiment, the nozzle 212 includes four tubes 214: a first tube 214a, a second tube 214b, a third tube 214c, and a fourth tube 214d. However, each nozzle 212 can include more or less than four tubes as desired.

Continuing with FIGS. 18-20 and 21D, each of the plates 216a-216d can include a body that defines a plurality of surfaces. Though only one of the plates 216 is described, it can be equally representative of each of the plates 216a-216d. The body of the plate 216 can define a first surface 217a, a second surface 217b that extends from the first surface 217a, a third surface 217c that extends from the second surface 217b, and a fourth surface 217d that extends from the third surface 217c to the first surface 217a. The first surface 217a can extend substantially normal to the vertical direction 6. The second surface 217b can be substantially perpendicular to the first surface 217a, and can define a first opening for bores 240a-240b that extend through the body of the plate 216. Each of the bores 240a-240b is configured to receive a fastener 225 that secures the plate 216 to the manifold 12. Though two bores 240a-240b are shown, the plate 216 can define more or less bores as desired. For example, the plate 216 can define one, three, or more than three bores. The third surface 217c can be curved, so as to form a semi-circular shape. The fourth surface 217d can extend substantially perpendicular to the first surface 217a, such that the fourth surface 217d is opposite the second surface 217b. The fourth surface 217d can also define a second opening for the bores 240a-240b, such that the bores 240a-240b extend through the plate 216 from the second surface 217b to the fourth surface 217d.

The plate 216 can also define first and second side surfaces, which can be designated as fifth and sixth surfaces 217e and 217f. The fifth and sixth surfaces 217e and 217f each extend between each of the first through fourth surfaces 217a-217d, such that each of the four surfaces 217a-217d extends from the fifth surface 217e to the sixth surface 217f. As a result, the fifth surface 217e can be substantially opposite the sixth surface 217f. The fifth surface 217e can define a first opening for a passage 218b that extends through the plate 216, and the sixth surface 217f can define a first opening for a passage 218a that extends through the plate 216. The plate 216 can further define a seventh surface 217g that extends upward from the third surface 217c laterally between the fifth and sixth surface 217e and 217f. The seventh surface 217g can define a channel 219 that extends through the plate 216 along the longitudinal direction 2. The channel 219 may extend through the lower end of the plate 216, such that the plate defines two arms 221a and 221b. The first and second arms 221a and 221b can be spaced apart along the lateral direction 4. The first arm 221a can define the first passage 218a that extends from the sixth surface 217f to the seventh surface 217g, while the second arm 221b can define the second passage 218b that extends from the fifth surface 217e to the seventh surface 217g. The first and second passages 218a and 218b can each be configured to receive a portion of the rod 207 that extends through the first clamp 204, which couples the first clamp 204 to the plate 216.

Figure 18:
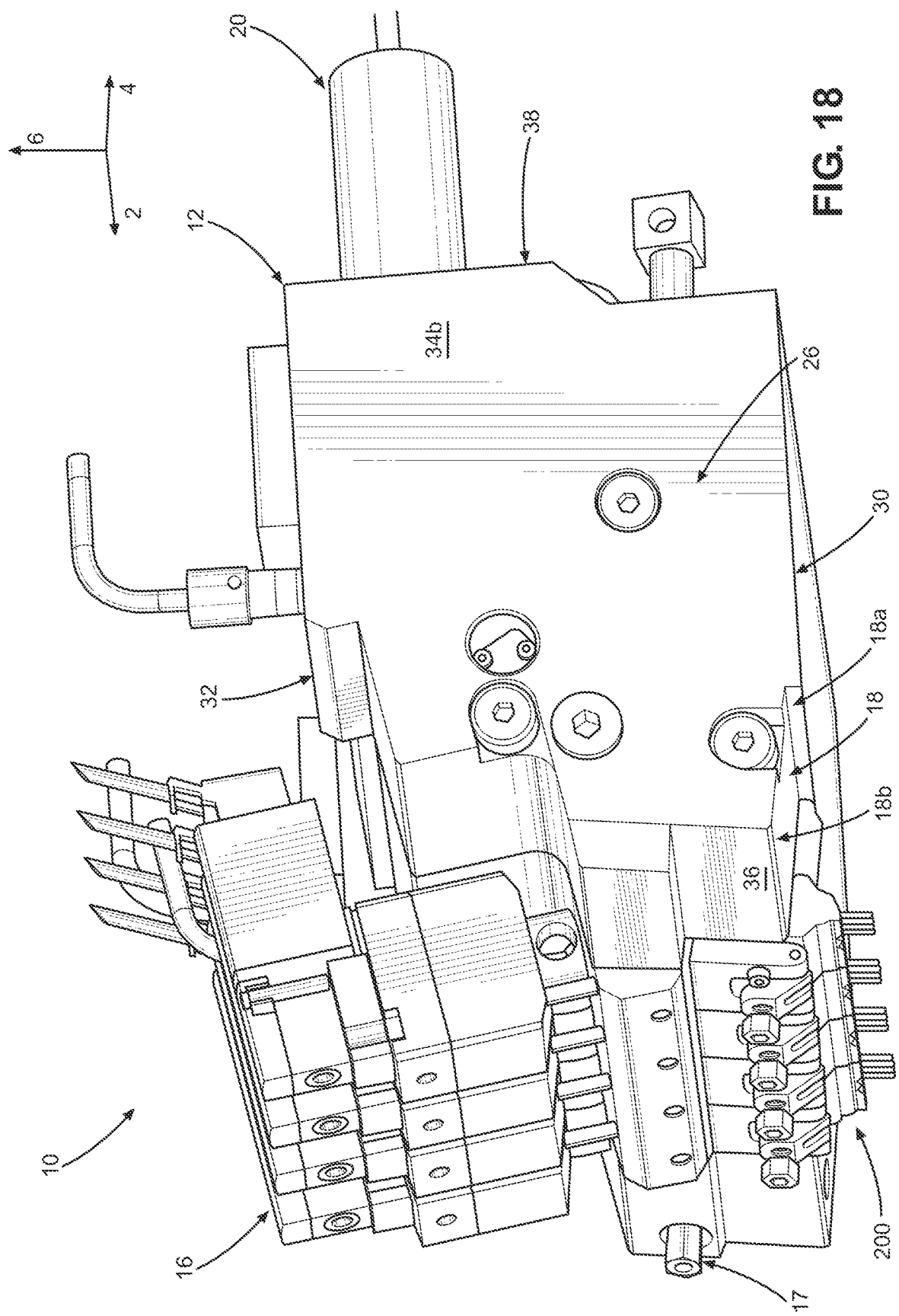
FIG. 18 is a side perspective view of the applicator shown in FIG. 1, with a second nozzle assembly attached to the manifold.
Figure 19:
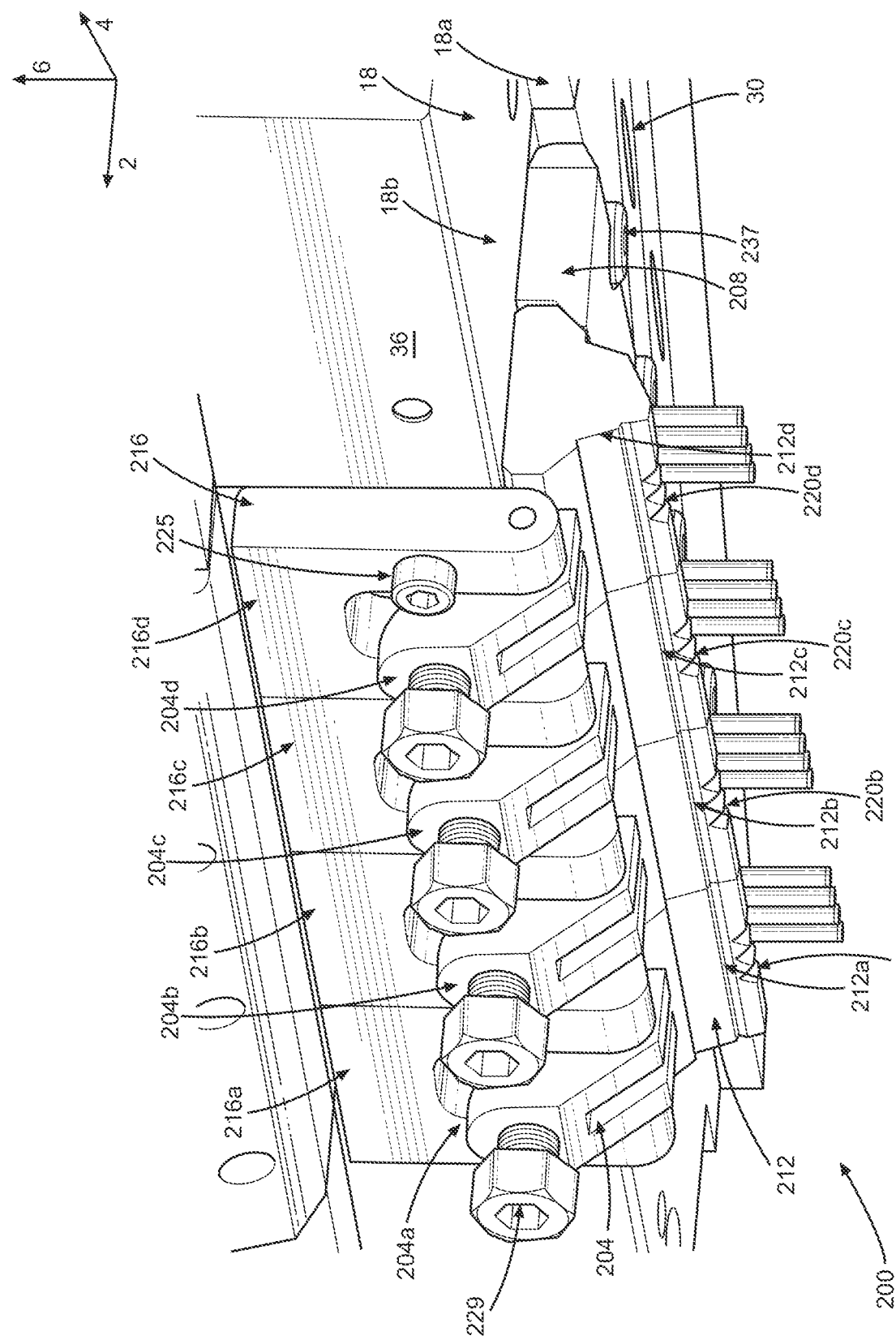
FIG. 19 is a front perspective view of a portion of the applicator shown in FIG. 18.
Figure 20:
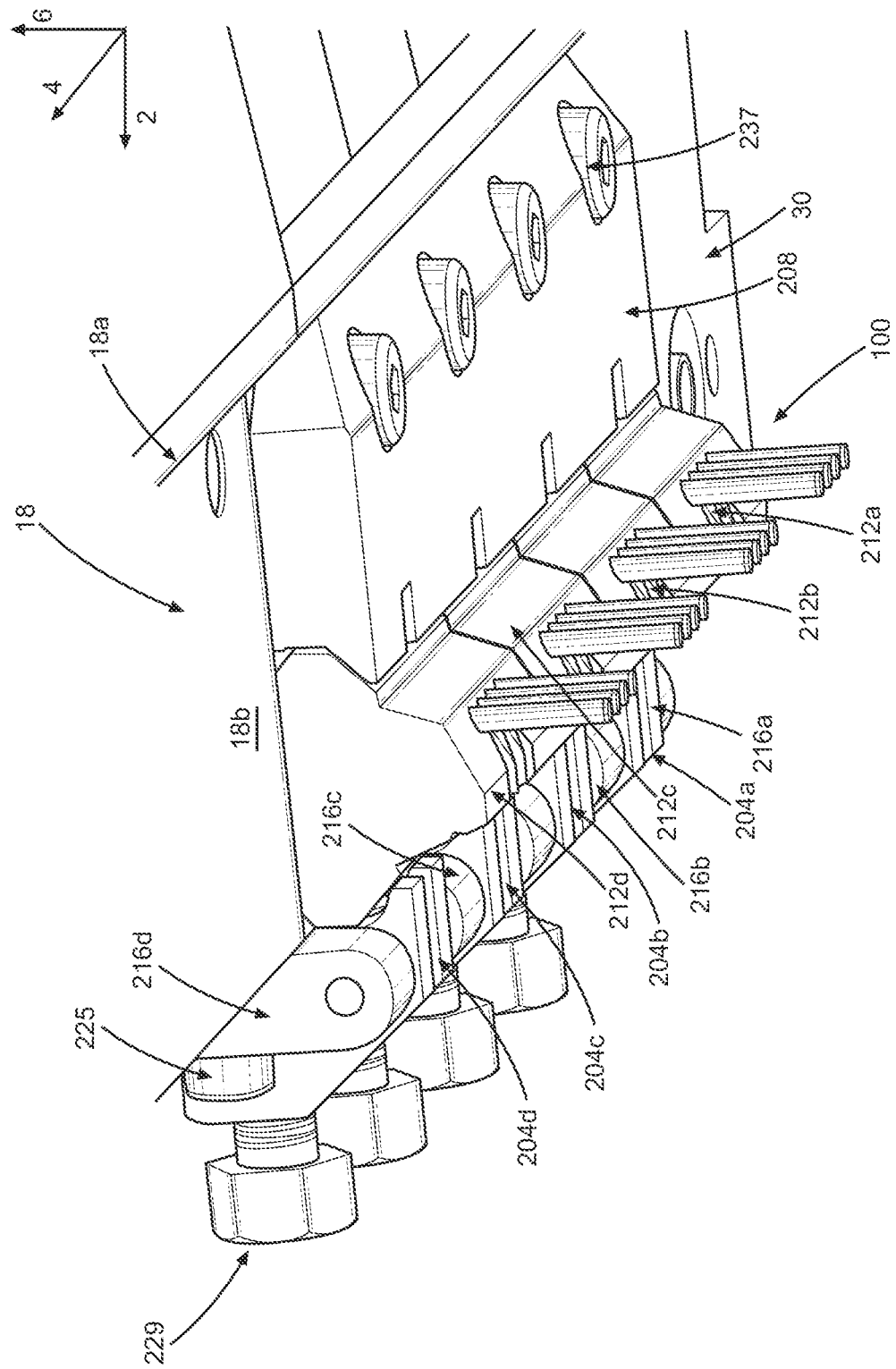
FIG. 20 is a rear perspective view of a portion of the applicator shown in FIG. 18.

The interaction of the various parts of the second nozzle assembly 200 when the second nozzle assembly 200 is secured to the manifold 12 will now be described. As shown in FIGS. 17-19, when the second nozzle assembly 200 is attached to the manifold 12, the first clamps 204a-204d and respective plates 216a-216d can be coupled together by disposing the rods 207 through the passages 228a and 228b of each of the first clamps 204a-204d and through the passages 218a and 218b of each of the plates 216a-216d. The plates 216a-216d are attached to the manifold 12, particularly the first contact surface 39 of the manifold 12, by disposing the fasteners 225 through the bores 240a and 240b of the plates 216a-216d and into the bores 37 of the manifold 12. The fasteners 225 can be screws, bolts, or any other type of fastener that is capable of releasably coupling the plates 216a-216d to the manifold 12. However, it is contemplated that the fasteners 225 can irremovably couple the plates 216a-216d to the manifold 12. In this configuration, the fourth surface 217d of each of the plates 216a-216d can engage the first contact surface 39 of the manifold 12. Further, the plates 216a-216d can be secured to the body 13 of the manifold 12 by disposing the fasteners 229 through the bores 224 of each of the first clamps 204a-204d, such that the fasteners 229 contact the body 13 of the manifold 12. Specifically, the fasteners 229 can contact the first contact surface 39 of the manifold 12.

To secure the nozzles 212a-212d to the manifold 12, the first clamps 204a-204d engage the body 13 of the manifold 12 and a first side of the respective nozzles 212a-212d, while the second clamp 208 engages the body 13 of the manifold 12 and the second side of the nozzles 212a-212d. Specifically, the second surface 213b of each of the nozzles 212a-212d can engage the fifth surface 205e of a respective one of the first clamps 204a-204d. Additionally, the third surface 213c of each of the nozzles 212a-212d can also engage the fifth surface 205e of a respective one of the first clamps 204a-204d. The first clamps 204a-204d can impart an upward and rearward force on the nozzles 212a-212d through the fifth surface 205e to keep the nozzles 212a-212d engaged with the body 13 of the manifold 12. On the other side of the nozzles 212a-212d, the second clamp 208 engages the nozzles 212a-212d to impart an upward an forward force onto the nozzles 212a-212d. As a result, the nozzles 212a-212d are effectively wedged between the first clamps 204a-204d and the second clamp 208. This wedging helps prevent leaks between the nozzles 212a-212d and the manifold 12, as well as ensures adequate heat transfer from the manifold 12 to the nozzles 212a-212d. When the nozzles 212a-212d and the second clamp 208 are connected to the body of the manifold 12, the eighth surface 213h of each of the nozzles 212a-212d can engage the second surface 208b of the second clamp 208, and the seventh surface 213g of each of the nozzles 212a-212d can engage the third surface 208c of the second clamp 208. In this configuration, the first surface 208a of the second clamp 208 can engage the second contact surface 18a of the body 13 of the manifold 12, and the fifth surface 208e of the second clamp 208 can engage the second contact surface 18c of the body 13 of the manifold 12. To secure the second clamp 208 to the manifold 12, fasteners 237 are disposed through the second clamp bores 236a-236d of the second clamp 208 and into the bores 31 that extend into the second contact surface 18a of the manifold 12.

Though not depicted, it is contemplated that in other embodiments elements of the first and second nozzle assemblies 100 and 200 may be used in conjunction with other types of nozzles. For example, the first clamp 104 and/or the second clamp 108 of the first nozzle assembly 100 can be used to secure the nozzle 110 to the body 13 of the manifold 12 in one embodiment, and can be used to secure a different type of nozzle or a variety of other types of nozzles to the body 13 of the manifold 12 in another embodiment. Likewise, the first clamp 204 and/or the second clamp 208 of the second nozzle assembly 200 can be used to secure the second nozzle 212 to the body 13 of the manifold 12 in one embodiment, and can be used to secure a different type of nozzle or a variety of other types of nozzles to the body 13 of the manifold 12 in another embodiment. Examples of other types of nozzles that can be used with elements of the first and second nozzle assemblies 100 and 200 are described in U.S. Pat. Nos. 8,220,725 and 9,168,554, each of which is hereby incorporated in its entirety.

The ability to use a single manifold 12 in combination with multiple types of nozzles, such as the first nozzle assembly 100, which includes a liquid adhesive contact nozzle, and the second nozzle assembly 200, which includes a liquid adhesive spray nozzle, provides many benefits for product manufacturers that perform different types of adhesive dispensing operations. A product manufacturer can now purchase a single applicator 10 to perform multiple types of adhesive dispensing operations, rather than purchasing multiple different applicators that can only perform a single type of adhesive dispensing operation. This minimizes manufacturing costs. To perform a new adhesive dispensing operation, the manufacturer must only purchase a new nozzle assembly to attach to the existing applicator 10, rather than purchase a separate new applicator. This interchangeability can apply to nozzle assemblies that may exist at the time of purchasing the applicator 10, as well as nozzle assemblies that could be produced after the applicator 10 is already acquired.

In addition to reducing costs, the applicator 10 can reduce downtime between adhesive dispensing operations. When switching from one adhesive dispensing operation to another, an operator can quickly disengage the nozzle assembly from the first, second, and third contact surfaces 39, 18a, and 18b and the corresponding recess 18 of the body 13 of the manifold 12 and attach a new nozzle assembly to the manifold 12. The process of replacing nozzle assemblies from the applicator 10 requires significantly less time than completely removing the whole applicator and setting up a separate, additional applicator. As a result, the overall productivity of multiple manufacturing operations can be increased through the utilization of the applicator 10.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. An adhesive dispensing system for applying liquid adhesive to a substrate, the adhesive dispensing system comprising:
   a manifold having a first contact surface and a second contact surface angularly offset from the first contact surface;
   a plurality of first clamps that releasably engage the manifold, each first clamp of the plurality of first clamps having a first clamping surface angled relative to the first contact surface of the manifold and a manifold clamping surface angularly offset from the respective first clamping surface;
   a second clamp that releasably engages the manifold, the second clamp having a second clamping surface angled relative to the second contact surface of the manifold; and
   a plurality of nozzles,
   wherein the second clamping surface imparts a force on each nozzle of the plurality of nozzles and the first clamping surface of each first clamp of the plurality of first clamps imparts a force on a corresponding nozzle of the plurality of nozzles, such that each first clamp of the plurality of first clamps and the second clamp releasably secure each nozzle of the plurality of nozzles to the manifold,
   wherein the manifold clamping surface of each first clamp of the plurality of first clamps engages the first contact surface of the manifold, the second clamp engages the second contact surface of the manifold, and each nozzle of the plurality of nozzles engages the second contact surface of the manifold.

2. An adhesive dispensing system for applying liquid adhesive to a substrate, the adhesive dispensing system comprising:
   a manifold having a first contact surface and a second contact surface angularly offset from the first contact surface;

at least one first clamp that releasably engages the manifold, the at least one first clamp having a first clamping surface angled relative to the first contact surface of the manifold;

a second clamp that releasably engages the manifold, the second clamp having a second clamping surface angled relative to the second contact surface of the manifold; and at least one nozzle, comprising:
- a first nozzle plate;
- a second nozzle plate coupled to the first nozzle plate;
- a shim disposed between the first and second nozzle plates; and
- a nozzle slot defined by the shim and a gap between the first and second nozzle plates, wherein the liquid adhesive exits the adhesive dispensing system through the nozzle slot.

3. The adhesive dispensing system of claim 2, wherein the second nozzle plate has a top surface, a first surface angled relative to the top surface, and a second surface angled relative to the top surface.

4. The adhesive dispensing system of claim 3, wherein:
the top surface of the second nozzle plate engages the second contact surface of the manifold,
the first surface of the second nozzle plate engages the second clamping surface of the second clamp, and
the second surface of the second nozzle plate engages the first clamping surface of the at least one first clamp.

5. The adhesive dispensing system of claim 4, wherein the second nozzle plate has a third surface angled relative to the first surface.

6. The adhesive dispensing system of claim 5, wherein the third surface of the second nozzle plate engages the shim.

7. The adhesive dispensing system of claim 2, wherein the first nozzle plate has a top surface, a first surface angled relative to the top surface, and a second surface angled relative to the top surface.

8. The adhesive dispensing system of claim 7, wherein the first surface of the first nozzle plate engages the shim.

9. The adhesive dispensing system of claim 2, wherein each of the first nozzle plate, the shim, and the second nozzle plate have at least one bore that receives at least one fastener for releasably securing the first nozzle plate to the second nozzle plate.

10. The adhesive dispensing system of claim 1, wherein each nozzle of the plurality of nozzles defines a nozzle slot configured to emit the liquid adhesive.

11. The adhesive dispensing system of claim 10, wherein each nozzle of the plurality of nozzles includes a plurality of tubes that provide a pathway for a pressurized air to exit the respective nozzle and interact with the liquid adhesive flowing through the respective nozzle slot.

12. The adhesive dispensing system of claim 1, wherein each first clamp of the plurality of first clamps includes a plate that engages the first contact surface of the manifold.

13. The adhesive dispensing system of claim 12, wherein each first clamp of the plurality of first clamps includes a rod configured to secure the respective first clamp to a corresponding one of the plurality of plates.

14. The adhesive dispensing system of claim 2, wherein the at least one first clamp has at least one manifold bore that receives at least one manifold fastener for releasably securing the at least one first clamp to the first contact surface of the manifold.

15. The adhesive dispensing system of claim 14, wherein the at least one first clamp has at least one nozzle bore that receives at least one nozzle fastener for releasably securing the at least one first clamp to the first nozzle plate.

16. The adhesive dispensing system of claim 14, wherein the second clamp has at least one manifold bore that receives at least one manifold fastener for releasably securing the second clamp to the second contact surface of the manifold.

17. The adhesive dispensing system of claim 1, wherein:
the manifold has a third contact surface angularly offset from the second contact surface of the manifold,
the second clamp engages the third contact surface of the manifold,
the first clamping surface of each first clamp of the plurality of first clamps is obliquely angled relative to the first contact surface of the manifold, and
the second clamping surface of the second clamp is obliquely angled relative to the third contact surface of the manifold.

18. An adhesive dispensing system for applying liquid adhesive to a substrate, the adhesive dispensing system comprising:
a manifold;
a first clamp that releasably engages the manifold;
a second clamp that releasably engages the manifold; and
a nozzle, comprising:
- a first nozzle plate having has a top surface, a first surface angled relative to the top surface, and a second surface angled relative to the top surface;
- a second nozzle plate coupled to the first nozzle plate and having a top surface, a first surface angled relative to the top surface, a second surface angled relative to the top surface, a third surface angled relative to the second surface, a fourth surface angled relative to the third surface, and a fifth surface angled relative to the third surface;
- a shim disposed between the first and second nozzle plates and having a first surface and a second surface opposite the first surface thereof; and
- a nozzle slot defined by the shim and a gap between the first and second nozzle plates, wherein the liquid adhesive exits the adhesive dispensing system through the nozzle slot, wherein the first and second clamps releasably secure the nozzle to the manifold.

19. The adhesive dispensing system of claim 1, wherein the second contact surface has a bore that receives a fastener for securing the second clamp to the second contact surface.

20. The adhesive dispensing system of claim 2, wherein:
the manifold has a third contact surface angularly offset from the second contact surface of the manifold,
the second clamp engages the third contact surface of the manifold,
the first clamping surface of the at least one first clamp is obliquely angled relative to the first contact surface of the manifold, and
the second clamping surface of the second clamp is obliquely angled relative to the third contact surface of the manifold.

* * * * *